(12) United States Patent
Inoue

(10) Patent No.: US 9,037,345 B2
(45) Date of Patent: May 19, 2015

(54) INFORMATION PRESENTATION SYSTEM AND IN-VEHICLE APPARATUS

(75) Inventor: Akira Inoue, Ama-gun (JP)

(73) Assignee: DENSO CORPORATION, Kariya (JP)

( * ) Notice: Subject to any disclaimer, the term of this patent is extended or adjusted under 35 U.S.C. 154(b) by 120 days.

(21) Appl. No.: 14/001,070

(22) PCT Filed: Mar. 8, 2012

(86) PCT No.: PCT/JP2012/001580
§ 371 (c)(1),
(2), (4) Date: Aug. 22, 2013

(87) PCT Pub. No.: WO2012/132255
PCT Pub. Date: Oct. 4, 2012

(65) Prior Publication Data
US 2014/0015737 A1    Jan. 16, 2014

(30) Foreign Application Priority Data

Mar. 28, 2011 (JP) ................................. 2011-070332
Oct. 12, 2011 (JP) ................................. 2011-225168

(51) Int. Cl.
*G06F 3/14* (2006.01)
*H04M 1/725* (2006.01)

(52) U.S. Cl.
CPC ........... *G06F 3/1423* (2013.01); *H04M 1/7253* (2013.01); *H04M 1/72577* (2013.01)

(58) Field of Classification Search
CPC ............ G06F 3/1423; H04M 1/72577; H04M 1/7253
USPC ......................................................... 701/36
See application file for complete search history.

(56) References Cited

U.S. PATENT DOCUMENTS

2003/0156097 A1  8/2003  Kakihara et al.
2007/0126698 A1  6/2007  Iwamoto et al.
(Continued)

FOREIGN PATENT DOCUMENTS

JP    2005-354269 A    12/2005
JP    2006-339690      12/2006
(Continued)

OTHER PUBLICATIONS

Office action dated Jul. 28, 2014 in corresponding Korean Application No. 10-2013-7023059.
(Continued)

*Primary Examiner* — Mary Cheung
*Assistant Examiner* — Frederick Brushaber
(74) *Attorney, Agent, or Firm* — Harness, Dickey & Pierce, PLC

(57) ABSTRACT

A mobile terminal displays a screen image provided by an image data which is produced. An in-vehicle apparatus is fixed to a vehicle or is mounted on the vehicle to be portable. The mobile terminal sends the image data to the in-vehicle apparatus through communication such that a vehicle display portion of the in-vehicle apparatus displays a screen image provided by the image data. In a case where a communication between the in-vehicle apparatus and the mobile terminal is established, when one of the mobile terminal or the in-vehicle apparatus, in which an input operation has been performed prior to the other of the mobile terminal or the in-vehicle apparatus, is in operation, only the one of the mobile terminal or the in-vehicle apparatus is operable.

9 Claims, 11 Drawing Sheets

(56) References Cited

U.S. PATENT DOCUMENTS

| | | | |
|---|---|---|---|
| 2009/0248244 A1 | 10/2009 | Sumimoto et al. | |
| 2010/0127996 A1 | 5/2010 | Kakihara et al. | |
| 2011/0106432 A1 | 5/2011 | Kawaguchi et al. | |
| 2011/0307188 A1* | 12/2011 | Peng et al. | 702/33 |
| 2012/0005569 A1* | 1/2012 | Roh | 715/234 |
| 2013/0006674 A1* | 1/2013 | Bowne et al. | 705/4 |
| 2013/0046510 A1* | 2/2013 | Bowne et al. | 702/187 |
| 2013/0283196 A1* | 10/2013 | Farnan et al. | 715/771 |
| 2014/0015737 A1* | 1/2014 | Inoue | 345/2.3 |
| 2015/0017969 A1* | 1/2015 | Takatsuji | 455/418 |

FOREIGN PATENT DOCUMENTS

| | | |
|---|---|---|
| JP | 2007-118626 A | 5/2007 |
| JP | 2007-161064 | 6/2007 |
| JP | 2007-195144 A | 8/2007 |
| JP | 2008-003093 A | 1/2008 |
| JP | 2008-306769 A | 12/2008 |
| JP | 2008-309794 A | 12/2008 |
| JP | 2009-135764 A | 6/2009 |
| JP | 2009-139347 A | 6/2009 |
| JP | 2009-281991 A | 12/2009 |
| JP | 2010-127781 A | 6/2010 |
| JP | 2010-130670 A | 6/2010 |
| JP | 2010-130674 A | 6/2010 |

OTHER PUBLICATIONS

Office action dated Dec. 24, 2013 in corresponding Japanese Application No. 2011-225168.

International Search Report (Japanese and English) and Written Opinion (Japanese) of the ISA for PCT/JP2012/001580, ISA/JP, mailed May 1, 2012.

* cited by examiner

INFORMATION PRESENTATION SYSTEM AND IN-VEHICLE APPARATUS

CROSS-REFERENCE TO RELATED APPLICATIONS

This application is a 371 U.S. National Stage of International Application No. PCT/JP2012/001580, filed Mar. 8, 2012, which is based on Japanese Patent Applications No. 2011-70332 filed on Mar. 28, 2011 and Japanese Patent Applications No. 2011-225168 filed on Oct. 12, 2011, the disclosures of which are incorporated herein by reference.

TECHNICAL FIELD

The present disclosure relates to an in-vehicle apparatus and an information presentation system in which the in-vehicle apparatus and a mobile terminal are connected and a screen image of the mobile terminal is displayed on the in-vehicle apparatus.

BACKGROUND ART

Conventionally, a technology is provided for displaying a screen image of a mobile terminal on an in-vehicle apparatus or for operating the mobile terminal through an operation input to the in-vehicle apparatus by connecting the in-vehicle apparatus and the mobile terminal. For example, in Patent Documents 1 to 3, technologies are disclosed in which a mobile phone and the in-vehicle apparatus with a display are connected, and a screen image of the mobile phone is displayed on the display of the in-vehicle apparatus or the mobile phone is operated through the operation input to the in-vehicle apparatus. Especially, in Patent Document 3, it is disclosed that, when driving in a sharp bend, an image data received from the mobile phone is not displayed on the screen of the in-vehicle apparatus.

In addition, in Patent Documents 4 to 8, technologies are disclosed in which the mobile phone and the in-vehicle apparatus with the display are connected, and the screen image of the mobile phone is displayed on the display of the in-vehicle apparatus. Especially, in Patent Document 7, it is disclosed that, when a vehicle is in driving, it is forbidden to display video data, outputted from the mobile phone, on the screen of the in-vehicle apparatus for front seats. In addition, in Patent Document 8, it is disclosed that, when a vehicle is in driving, an operation of the in-vehicle apparatus or the mobile phone is restricted.

There is a possibility that the driver may not concentrate on a driving operation when the driver operates an in vehicle apparatus or a mobile terminal with driving a vehicle. In technologies disclosed in Patent Documents 1, 2, and 4 to 6, it is not considered to restrict an operation of the in-vehicle apparatus according to a vehicle driving state. In technologies disclosed in Patent Documents 3, 7, it is only considered to restrict presentation in the in-vehicle apparatus according to the vehicle driving state and it is not considered to restrict an operation of the in-vehicle apparatus.

On the other hand, in a technology disclosed in Patent Document 8, it is considered to restrict a presentation in the in-vehicle apparatus according to the vehicle driving state. However, although, in the technology disclosed in Patent Document 8, an operation of the in-vehicle apparatus is restricted when a vehicle is driving, an operation of the mobile terminal is also restricted. Thus, even when an occupant other than the driver tries to operate the mobile terminal, the operation of the mobile terminal is restricted and convenience is reduced.

In addition, in Patent Documents 1 to 7, it is not described which of the operations between the mobile terminal and the in-vehicle apparatus has a priority while the mobile terminal and the in-vehicle apparatus are connected. It is not considered a case where the mobile terminal and the in vehicle apparatus are operated by two persons simultaneously. Therefore, in a case where the mobile terminal and the in-vehicle apparatus are connected and the screen image of the mobile terminal is displayed on the in-vehicle apparatus, and further, when the mobile terminal and the in-vehicle apparatus are operated by two persons simultaneously, the technologies disclosed in Patent Documents 1 to 7 may cause a false operation.

The following will be given as a specific example of the false operation in a case where the mobile terminal and the in-vehicle apparatus are operated by two persons simultaneously. It is postulated that a screen menu is displayed on the in-vehicle apparatus such that the driver selects one spot from searched multiple candidate spots in a process where the driver determines a destination on the in-vehicle apparatus in order to use a navigation function of the mobile terminal. In addition, it is postulated that the driver selects a candidate spot with the in-vehicle apparatus and a passenger simultaneously selects another candidate spot with the mobile terminal, respectively. In this case, even when the candidate spot selected by the passenger is registered, the driver may assume that the candidate spot selected by the driver is registered in a case where it is possible to select a candidate spot through the in vehicle apparatus. Therefore, when the driver starts to drive with having an incorrect assumption, the driver is guided to a different place from the driver's intention such that confusion and trouble may be caused.

PRIOR ART DOCUMENT

Patent Document

Patent Document 1: Japanese Unexamined Patent Publication No. 2003-244343.
Patent Document 2: Japanese Unexamined Patent Publication No. 2010-130674.
Patent Document 3: Japanese Unexamined Patent Publication No. 2009-281991.
Patent Document 4: Japanese Unexamined Patent Publication No. 2007-195144.
Patent Document 5: Japanese Unexamined Patent Publication No. 2008-003093.
Patent Document 6: Japanese Unexamined Patent Publication No. 2008-309794.
Patent Document 7: Japanese Unexamined Patent Publication No. 2009-139347.
Patent Document 8: Japanese Unexamined Patent Publication No. 2010-130670.

SUMMARY OF THE INVENTION

It is an object of the present disclosure to provide an information presentation system and an in-vehicle apparatus, which possible to prevent a false operation due to simultaneous operations by two persons in the mobile terminal and the in-vehicle apparatus, to prevent from disturbing concentration on a driving operation, and to preserve convenience to occupants in a case where the in-vehicle apparatus and the mobile terminal are connected and a screen image of the mobile terminal is displayed on the in vehicle apparatus.

According to one embodiment of the present disclosure, the information presentation system includes the mobile terminal to display a screen image, provided by an image data which is produced, on a mobile display portion. The information presentation system further includes an in-vehicle apparatus, which is fixed to a vehicle or mounted on the vehicle to be portable. The mobile terminal includes a mobile communicator for communicating with the in-vehicle apparatus. The mobile terminal further includes a mobile operation input portion, to which an operation input is performed by a user. The in-vehicle apparatus includes a vehicle communicator for communicating with the mobile terminal. The in-vehicle apparatus further includes a vehicle operation input portion, to which the operation input is performed by the user. In the information presentation system, a communication between the in-vehicle apparatus and the mobile terminal is established, and the image data is sent from the mobile terminal to the in-vehicle apparatus so that a vehicle display portion of the in-vehicle apparatus displays the screen image, provided by the image data. In the information presentation system, in a case where the communication between the in vehicle apparatus and the mobile terminal is established, only one of the mobile terminal or the in-vehicle apparatus, in which the operation input has been performed prior to other of the mobile terminal or the in-vehicle apparatus, is operable when the one of the mobile terminal or the in-vehicle apparatus, in which the operation input has been performed prior to the other of the mobile terminal or the in-vehicle apparatus, is in operation.

According to other embodiment of the present disclosure, the in vehicle apparatus is fixed to a vehicle or is mounted on the vehicle to be portable and includes a mobile operation input portion to perform an operation input by a user. The in-vehicle apparatus receives an image data, which is produced in the mobile terminal so as to be displayed on a screen of the mobile terminal, from a mobile terminal through a vehicle communicator and displays a screen image provided by the image data, which is received from the mobile terminal, on a vehicle display portion. In a case where a communication between the in-vehicle apparatus and the mobile terminal has been established, only one of the mobile terminal or the in-vehicle apparatus, which is operated prior to other of the mobile terminal or the in-vehicle apparatus, is operable when the vehicle is not in driving and when the one of the mobile terminal or the in-vehicle apparatus is in operation. In a case where the communication between the in-vehicle apparatus and the mobile terminal has been established, the in-vehicle apparatus is inoperable and the mobile terminal is operable when the vehicle is in driving.

BRIEF DESCRIPTION OF THE DRAWINGS

The above and other aspects, features and advantages of the present disclosure will become more apparent from the following detailed description made with reference to the accompanying drawings. In the drawings.

PREFERRED EMBODIMENTS FOR CARRYING OUT THE INVENTION

Figure 1:
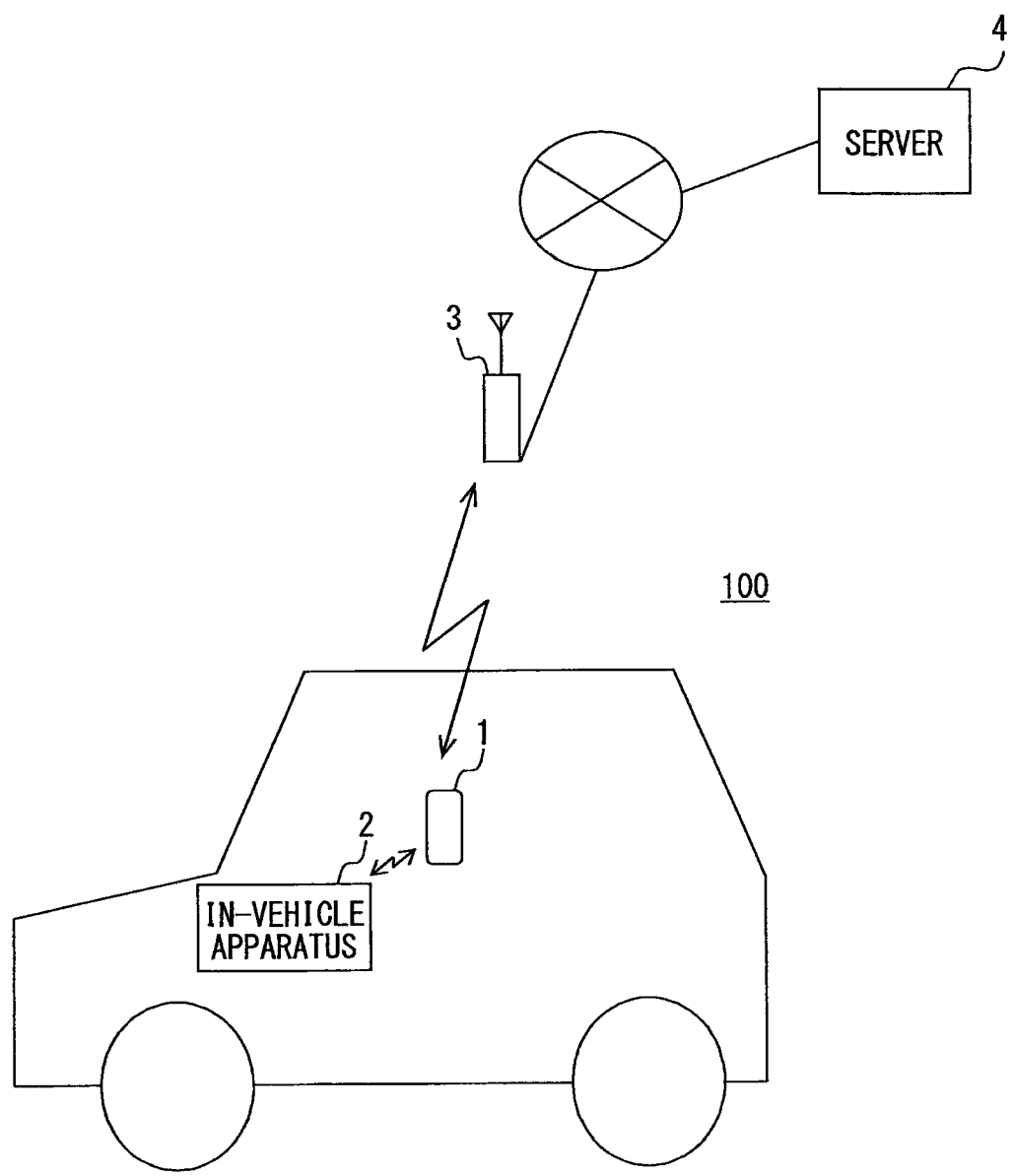
FIG. 1 is a block diagram illustrating a schematic configuration of an information presentation system.

Following, an embodiment of the present disclosure will be described with reference to drawings. FIG. 1 is a block diagram illustrating a schematic configuration of an information presentation system 100 according to the present disclosure. The information presentation system 100 described in FIG. 1 includes a smartphone 1 and an in-vehicle apparatus 2. In the information presentation system 100, the image data is sent to the in vehicle apparatus 2, and a screen image provided by the image data is displayed on a screen of the in-vehicle apparatus 2 or the smartphone 1 is operated by an operation input to the in vehicle apparatus 2. The image data is produced in the smartphone 1 for displaying on a screen of the smartphone 1.

The smartphone 1 corresponds to a so-called touch panel mobile phone (in other words, a smartphone provided with a touch panel such that an operation portion is integrated to a screen), and an operation input is performed with a touch panel. The smartphone 1 has a verbal communication function, a mail function, a music play function, a map function or the like similar to a conventional touch panel mobile phone. The smartphone 1 corresponds to a mobile terminal.

Figure 2:
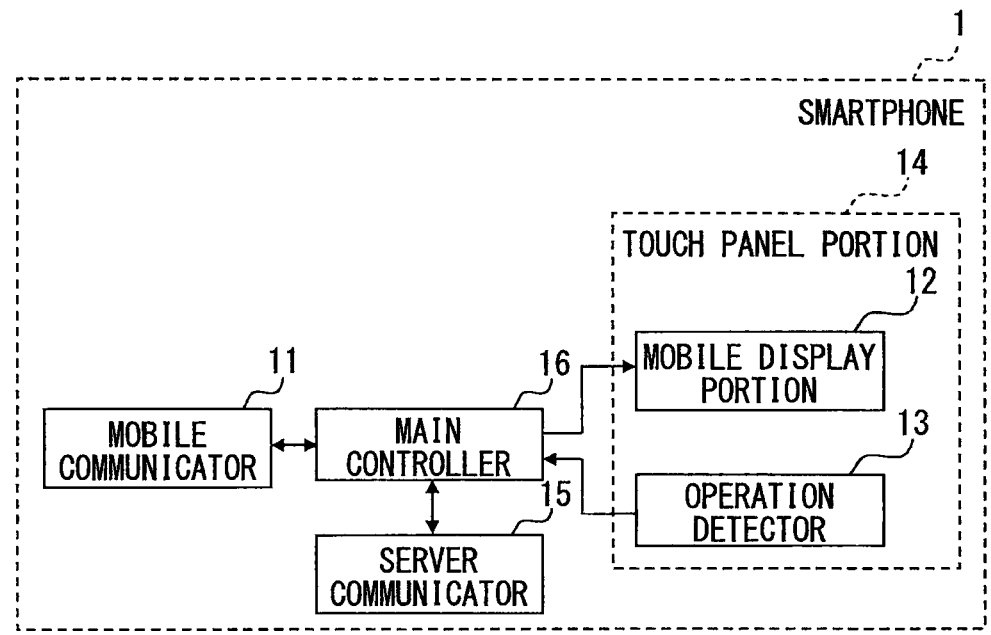
FIG. 2 is a block diagram illustrating a schematic configuration of a smartphone.

A schematic configuration of the smartphone 1 will be described with reference to FIG. 2. As a matter of convenience, in a configuration related to functions included in the conventional touch panel mobile phone, an explanation of unnecessary features to describe the present disclosure will be skipped. FIG. 2 is a block diagram illustrating a schematic configuration of the smartphone 1. As shown in FIG. 2, the smartphone 1 includes a mobile communicator 11, a touch panel portion 14 having a mobile display portion 12 and an operation detector 13, a server communicator 15, and a main controller 16.

The mobile communicator 11 communicates with the in-vehicle apparatus 2 according to, for example, a Bluetooth (a registered trademark). Hereinafter, this communication is referred to a BT communication. A communication between the smartphone 1 and the in-vehicle apparatus 2 may be performed by near-field communication standards, such as a ZigBee (a registered trademark), or wireless local area network standards, such as IEEE 802.11 in addition to the Bluetooth (a registered trademark). The communication between the smartphone 1 and the in-vehicle apparatus 2 is not necessarily limited to a wireless communication, and the communication between the smartphone 1 and the in-vehicle apparatus 2 may be performed by a wired communication with a USB connection or the like.

The mobile display portion 12 displays a screen image or the like according to each application program of the smartphone 1 (hereinafter, an application). For example, the mobile display portion 12 can generate a full color image and includes a liquid crystal display, an organic electroluminescence display, a plasma display or the like.

The operation detector 13 is provided by a touch switch integrated with the mobile display portion 12. The operation detector 13 detects an operation of a switch corresponding to a touch position, and inputs a position information to the main controller 16. In other words, the operation detector 13 detects a position where the operation is performed on the screen of the mobile display portion 12, and inputs the position information to the main controller 16. Incidentally, the operation detector 13 corresponds to a mobile operation input portion. The position information described above corresponds to, for example, coordinates on the screen of the mobile display portion 12.

In addition, the touch switch may be a capacitive touch switch, a resistive film touch switch, or another type of touch switches. In a case where the screen is divided into a predetermined number of regions and handled, for example, the position information may correspond to an identifier such as ID to specify each of the regions.

The touch panel portion 14 integrally includes the mobile display portion 12 and the operation detector 13. According to instructions of the main controller 16, the touch panel portion 14 controls the mobile display portion 12 to display a screen image including a button image, for example. In addition, when an operation is performed to the button image, the touch panel portion 14 detects an operated position of the button image by the operation detector 13, and inputs the position information to the main controller 16. The touch panel portion 14 corresponds to a mobile touch panel.

The server communicator 15 wirelessly communicates with a mobile phone base station 3, and communicates with a server 4 through the mobile phone base station 3 or communication networks, such as a mobile phone network or an Internet.

The main controller 16 is a conventional computer, and includes a well known CPU, a ROM, EEPROM, a RAM, an I/O, and a bus line connecting these components (all not shown). The main controller 16 executes each process based on various information that are inputted from the mobile communicator 11, the touch panel portion 14 and the server communicator 15.

For example, the main controller 16 executes an application program (hereinafter, an application) and produces image data so as to display a screen image, according to the application, on the touch panel portion 14, and displays the screen image on the touch panel portion 14. The application may be stored in the ROM in advance, or may be downloaded by the server communicator 15 from the server 4 through the mobile phone base station 3 or the communication networks such as network.

The main controller 16 determines which button image is operated on the screen of the touch panel portion 14, based on the position information from the touch panel portion 14. The main controller 16 performs a process according to the operated button image.

Furthermore, the main controller 16 performs a pairing process to establish the BT communication through the in-vehicle apparatus 2 and the mobile communicator 11. The main controller 16 sends the image data, which is produced to be displayed on the touch panel portion 14, and a display region information to the in vehicle apparatus 2 through the mobile communicator 11, in a case where the BT communication is established between the smartphone 1 and the in-vehicle apparatus 2 such that a terminal mode is set.

The image data described above corresponds to, for example, color information of each pixel. In addition, the display region information provides a screen size that is equal to a width multiplied by a height, a resolution or the like.

The terminal mode described above is a mode in which the screen image of the smartphone 1 is displayed on the in-vehicle apparatus 2 and the smartphone 1 is operated by an operation input to the in-vehicle apparatus 2. A setting of the terminal mode may be selectable by the operation input from a user through the touch panel portion 14. The terminal mode may be automatically used when the BT communication between the smartphone 1 and the in-vehicle apparatus 2 is established and the smartphone 1 is connected to the in-vehicle apparatus 2.

As described below in detail, while the above described terminal mode is selected, the main controller 16 determines which button image is operated on the screen of the touch panel portion 14 based on the position information inputted from the in-vehicle apparatus 2 through the mobile communicator 11. The main controller 16 performs a process according to the operated button image.

In FIG. 1, the in-vehicle apparatus 2 is fixed to a vehicle of an automobile or the like, or is mounted on the vehicle to be portable and displays an image. The in-vehicle apparatus 2 includes, for example, a vehicle display device and a vehicle navigation device. Incidentally, the in-vehicle apparatus 2 may be a vehicle navigation device integrated with a display, or may be a pair of a display and a vehicle navigation device without a display. In the present embodiment, as an example, it is postulated that the in-vehicle apparatus 2 is a vehicle navigation device integrated with a display to be described below.

Figure 3:
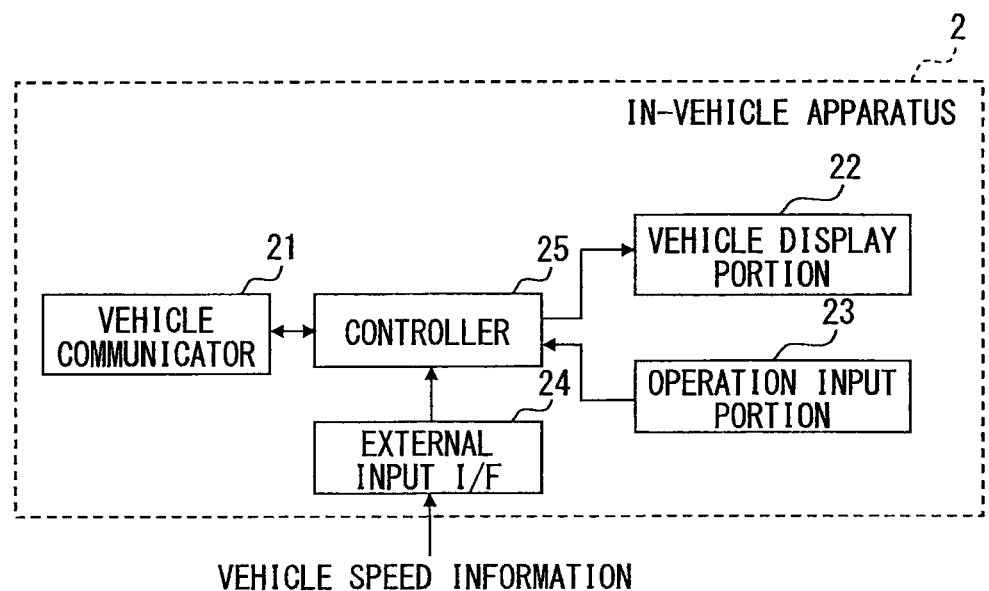
FIG. 3 is a block diagram illustrating a schematic configuration of an in-vehicle apparatus.

A schematic configuration of the in-vehicle apparatus 2 will be described with reference to FIG. 3. As a matter of convenience, in an configuration related to functions included in the in-vehicle apparatus 2, a explanation of unnecessary features to describe the present invention will be skipped. FIG. 3 is a block diagram illustrating a schematic configuration of the in-vehicle apparatus 2. As described in FIG. 3, the in-vehicle apparatus 2 includes a vehicle communicator 21, a vehicle display portion 22, an operation input portion 23, an external input interface (I/F) 24, and a controller 25.

The vehicle communicator 21 communicates with the smartphone 1 through, for example, the BT communication. A communication between the in-vehicle apparatus 2 and the smartphone 1 may be wirelessly connected or may be connected by wire, as described above. The vehicle communicator 21 receives the display region information and the image data transmitted from the mobile communicator 11, and inputs them to the controller 25. The vehicle communicator 21 sends the position information outputted from the controller 25 to the mobile communicator 11, according to an instruction from the controller 25.

The vehicle display portion 22 displays a screen image or the like according an instruction from the controller 25. For example, the vehicle display portion 22 can generate a full color image and includes a liquid crystal display, an organic electroluminescence display, a plasma display, or the like.

The operation input portion 23 includes a touch switch integrated with the vehicle display portion 22, a mechanical switch, a remote switch or the like. The operation input portion 23 inputs instructions of various functions to the controller 25 through a switch operation. Therefore, the operation input portion 23 corresponds to a vehicle operation input portion. A part of the operation input portion 23 may be a touch switch integrated with the vehicle display portion 22, and another part of the operation input portion 23 may be a mechanical switch.

In the present embodiment, a following description will be made on an assumption that at least a part of the operation input portion 23 includes a touch switch (i.e., a vehicle touch panel) integrated with the vehicle display portion 22. Therefore, the vehicle display portion 22 and the operation input portion 23 correspond to the vehicle touch panel. In addition, the touch switch of the operation input portion 23 functions to detect which position is operated on a screen of the vehicle display portion 22 and to input a position information to the controller 25.

The external input I/F 24 is an interface such that the controller 25 obtains information from a group of sensors of a vehicle. For example, the controller 25 obtains information of speed of the vehicle (i.e., vehicle speed) detected by an unshown vehicle speed sensor through the external input I/F. The information of vehicle speed may be directly obtained from the vehicle speed sensor, or indirectly obtained through an ECU or a vehicle LAN.

The controller 25 is a conventional computer, and includes a well known CPU, a ROM, EEPROM, a RAM, an I/O, and a bus line, connecting these components (all not shown). The controller 25 executes each process based on various information inputted from the vehicle communicator 21, the operation input portion 23 and the external input I/F 24.

When the controller 25 receives an input of an image data (hereinafter, a mobile-phone-derived image data) sent from the smartphone 1 through the vehicle communicator 21, the controller 25 produces an image (hereinafter, a vehicle generated image) according to the mobile-phone-derived image data to output to the vehicle display portion 22, and displays a screen image provided by the mobile-phone-derived image data on the vehicle display portion 22. For example, the controller 25 produces the vehicle generated image, in which a size and a resolution of the mobile-phone-derived image data is converted to a size and a resolution of the screen of the vehicle display portion 22, based on the display region information sent from the smartphone 1.

Incidentally, in the present embodiment, the size and the resolution of the mobile-phone-derived image data are converted to the size and the resolution of the screen of the vehicle display portion 22, respectively, based on the display region information sent from the smartphone 1. However, it is not necessarily limited to this configuration. For example, conversion ratios of the size or the resolution of the mobile-phone-derived image data may be stored as fixed values in a non-volatile memory such as a ROM of the controller 25 in advance, and the size or the resolution of the mobile-phone-derived image data may be converted according to the fixed values. In this configuration, the smartphone 1 may not send the display region information.

In a case where an input operation from the vehicle touch panel is valid, the controller 25 receives an input operation of a position information from the operation input portion 23, and identifies coordinates, which is correspond to the position information, on a screen of the touch panel portion 14 (specifically, the mobile display portion 12) of the smartphone 1 as an operation object region. The position information indicates the position operated on the screen of the vehicle display portion 22. A method for identifying the operation object region according to the position information may be an identifying method by performing a conversion reverse to a conversion where the vehicle generated image is produced by conversion of the size of the mobile-phone-derived image data.

A signal, indicating the coordinates identified as the operation object region, is sent to the smartphone 1 through the vehicle communicator 21. An input operation is performed to the smartphone 1, similar to a case where the input operation is performed to the operation object region on the screen of the touch panel portion 14 of the smartphone 1.

When one of the smartphone 1 or the in vehicle apparatus 2 is operated under the use in the terminal mode, the information presentation system 100 forbids an operation by the other of the smartphone 1 or the in-vehicle apparatus 2. In addition, a driving concentration action, in which an operation from the in-vehicle apparatus 2 is forbidden, is performed when driving a vehicle and instead an operation through the smartphone 1 is allowed. In order to realize the above two points, the information presentation system 100 sets an operation permission to receive the operation by the user, when the smartphone 1 and the in-vehicle apparatus 2 are connected under the use in the terminal mode.

The in-vehicle apparatus 2 manages the operation permission. In a default setting condition, the in vehicle apparatus 2 has the operation permission and transmits the operation permission to the smartphone 1 according to a certain condition. The operation permission includes, for example, two kinds of permissions such as an operation permission A and an operation permission B. When the user operates the smartphone 1, the smartphone 1 demands the operation permission A for the in-vehicle apparatus 2, and the in-vehicle apparatus 2 transmits the operation permission A to the smartphone 1. When the operation ends, the operation permission A is returned to the in-vehicle apparatus 2. For example, in an operation of the button image of the touch panel portion 14, a time when the operation is completed denotes a time when a process set to the button image is completed.

The process, which is set to the button image, may correspond to a process performed from an operation by the button image to an operation by another button image. Furthermore, the process, set to the button image, may be a bunch of processes including an operation of another button image in a case where the operation of the button image is performed. For example, in a destination setting, in a case where the operation of the button image is performed to set the destination, a process corresponds to a bunch of processes until the destination setting ends, including an operation of the button image to input the Japanese syllabary of a destination.

The in-vehicle apparatus 2 transmits the operation permission B to the smartphone 1, in a case where the above driving concentration action is performed. Then, the in-vehicle apparatus 2 demands a return of the operation permission B for the smartphone 1 and receives the operation permission B, in a case where the driving concentration action is released. The operation permission A and the operation permission B are provided by, for example, information (hereinafter, permission information) representing permission to receive an operation from the user.

The smartphone 1 is operable when the smartphone 1 has at least one of the operation permission A and the operation permission B. The in vehicle apparatus 2 is operable when the in-vehicle apparatus 2 has both of the operation permission A and the operation permission B. The operation permission A corresponds to a first permission information. The operation permission B corresponds to a second permission information.

Figure 4:
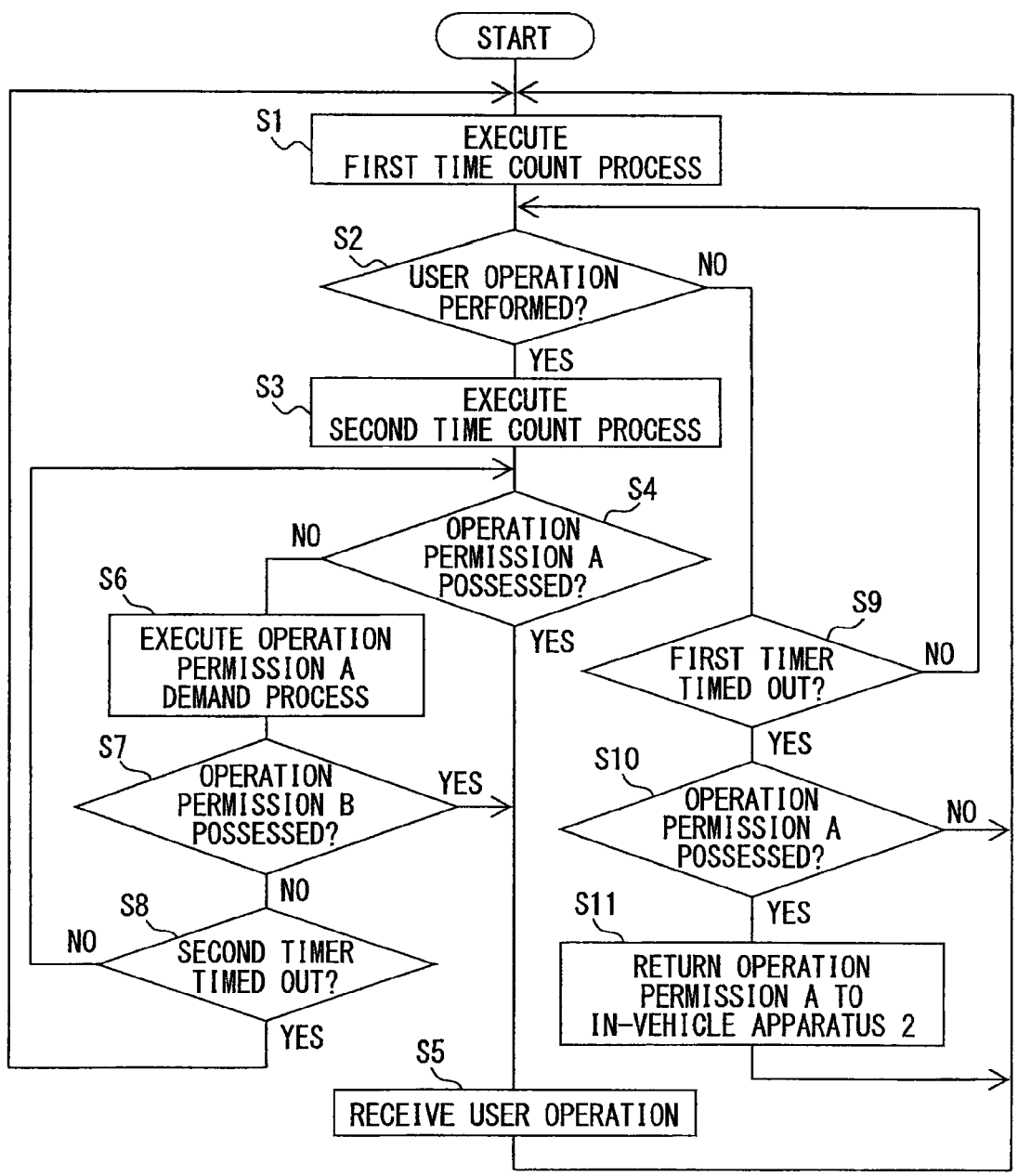
FIG. 4 is a flowchart illustrating an example of a flow in a main controller of the smartphone.
Figure 5:
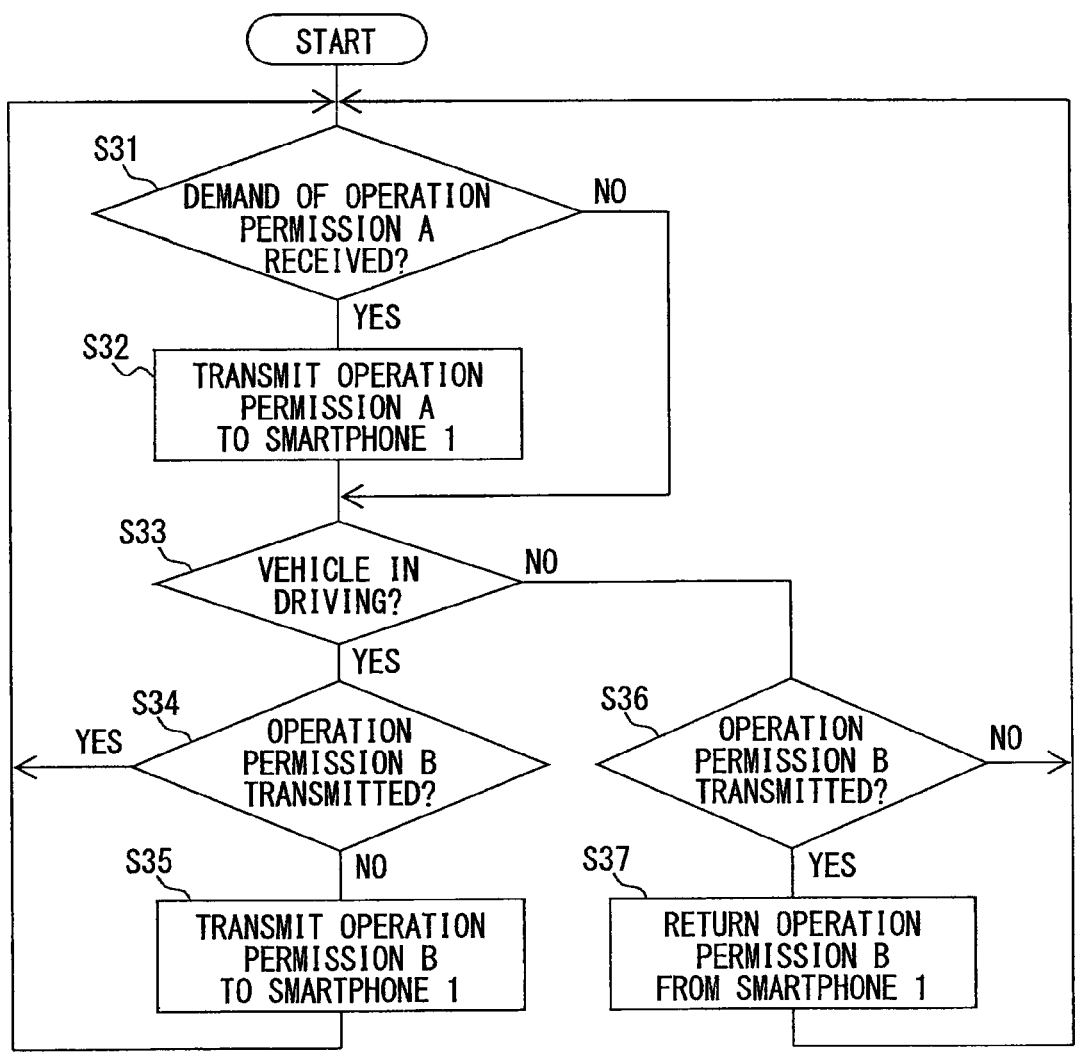
FIG. 5 is a flowchart illustrating an example of a management flow of an operation permission A and an operation permission B in a controller of an in-vehicle apparatus.
Figure 6:
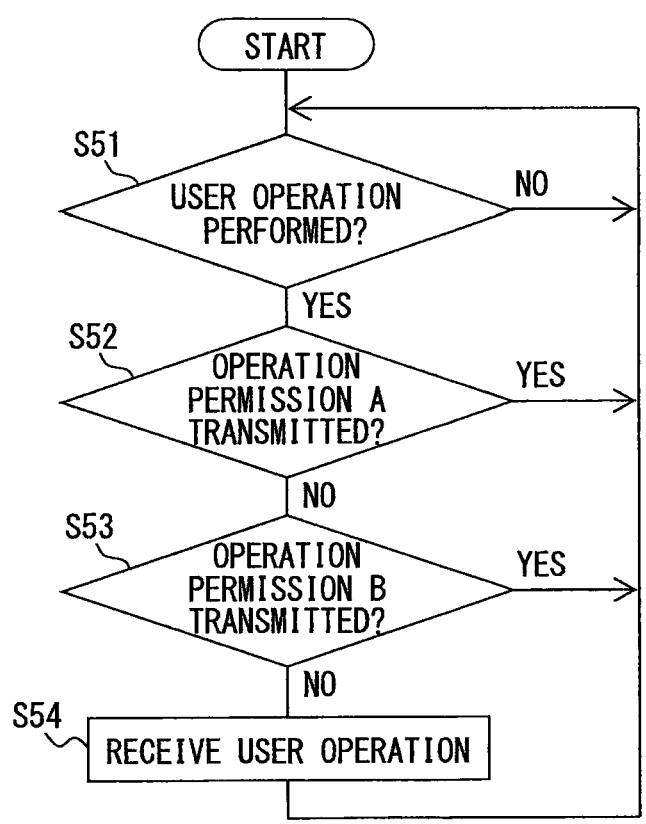
FIG. 6 is a flowchart illustrating an example of a flow in the controller of the in-vehicle apparatus.

A detail of a handover of the operation permission A and the operation permission B between the smartphone 1 and the in-vehicle apparatus 2, and authorization of an operation will be described with reference to FIG. 4 to FIG. 6. Firstly, a detail of a handover of the operation permission A and the operation permission B in the smartphone 1, and authorization of an operation will be described with reference to FIG. 4. FIG. 4 is a flowchart illustrating an example of a flow in the main controller 16 of the smartphone 1. It is postulated, for example, that the flow in FIG. 4 starts when the smartphone 1 and the in-vehicle apparatus 2 are connected and further when the use in the terminal mode starts, and that the flow is completed when the use in the terminal mode ends. In addition, in the flow in the FIG. 4, it is postulated that the smartphone 1 in a default setting condition can not receive an operation from the user and can not perform a process according to a user operation (i.e., the smartphone 1 can not execute the operation).

In step S1, a first time count process is performed, and a process proceeds to step S2. In the first time count process, a count of a first timer is initialized to start counting. The first timer may be, for example, an unshown timer circuit or the like provided in the main controller 16.

In step S2, it is determined whether an operation input (the user operation) is performed by the user to the smartphone 1. It may be determined whether the user operation is performed, according to a signal from the operation detector 13. When it is determined that the user operation is performed ("YES" in step S2), the process proceeds to step S3. When it is determined that the user operation is not performed ("NO" in step S2), the process proceeds to step S9.

In step S3, a second time count process is performed, and the process proceeds to step S4. In the second time count process, a second timer is initialized to start counting. The second timer may be, for example, an unshown timer circuit or the like provided in the main controller 16.

In step S4, it is determined whether the operation permission A is possessed. It may be determined whether the operation permission A is possessed, according to a determination whether the operation permission A is stored in a memory region in a RAM or the like, corresponding to a storing portion of the operation permission A. When it is determined that the operation permission A is possessed ("YES" in step S4), the process proceeds to step S5. When it is determined that the operation permission A is not possessed ("NO" in step S4), the process proceeds to step S6. In Step S5, the user operation is received through the touch panel portion 14, and a process according to the user operation is performed, and the process returns to step S1 to repeat the flow.

In step S6, a demand process of the operation permission A is performed and then the process proceeds to step S7. In the demand process of the operation permission A, a signal for demanding the operation permission A is sent to the in-vehicle apparatus 2 through the mobile communicator 11, and the operation permission A is outputted from the in-vehicle apparatus 2. The smartphone 1 obtains the operation permission A from the in-vehicle apparatus 2 through the mobile communicator 11.

In step S7, it is determined whether the operation permission B is possessed. It may be determined whether the operation permission B is possessed, according to a determination whether the operation permission B is stored in a memory region of a RAM or the like, corresponding to a storing portion of the operation permission B. When it is determined that the operation permission B is possessed ("YES" in step S7), the process proceeds to step S5. When it is determined that the operation permission B is not possessed ("NO" in step S7), the process proceeds to step S8.

In step S8, it is determined whether the second timer is timed out. It may be determined whether the second timer is timed out, according to a determination whether a count of the second timer is more or equal to a predetermined value. Incidentally, the predetermined value described above is a value that can be set arbitrarily and, for example, corresponds to a count value for some seconds.

When it is determined that the second timer is timed out ("YES" in step S8), the process returns to step S1 to repeat the flow. When it is determined that the second timer is not timed out ("NO" in step S8), the process returns to step S4 to repeat the flow.

In step S9, it is determined whether the first timer is timed out. It may be determined whether the first timer is timed out, according to a determination whether a count of the first timer is more or equal to a predetermined value. Incidentally, the predetermined value described above is a value which can be set arbitrarily and, for example, corresponds to a count value for some seconds.

When it is determined that the first timer is timed out ("YES" in step S9), the process proceeds to step S10. When it is determined that the first timer is not timed out ("NO" in step S9), the process returns to step S2 to repeat the flow.

In step S10, it is determined whether the operation permission A is possessed. Whether the operation permission A is possessed may be determined in a similar manner to step S4. When it is determined that the operation permission A is possessed ("YES" in step S10), the process proceeds to step S11. When it is determined that the operation permission A is not possessed ("NO" in step S10), the process returns to step S1 to repeat the flow. In step S11, the operation permission A is sent to the in-vehicle apparatus 2 through the mobile communicator 11, and the operation permission A is returned to the in-vehicle apparatus 2 and the process returns to the step S1 to repeat the flow.

Next, a detail of management of the operation permission A and the operation permission B in the in-vehicle apparatus 2 will be described. FIG. 5 is a flowchart illustrating an example of a management flow of the operation permission A and the operation permission B in the controller 25 of the in-vehicle apparatus 2. The flow in FIG. 5 starts when the smartphone 1 and the in-vehicle apparatus 2 are connected and when the use in the terminal mode starts. The flow in FIG. 5 is completed when the use in the terminal mode ends.

The in-vehicle apparatus 2 produces the operation permission A and the operation permission B when, for example, the use in the terminal mode starts. The operation permission A is stored in a memory region of a RAM or the like, corresponding to a storing portion of the operation permission A. The operation permission B is stored in another memory region of the RAM or the like, corresponding to a storing portion of the operation permission B. When the use in the terminal mode ends, the operation permission A and the operation permission B are deleted from the storing portions.

Firstly, in step S31, it is determined whether a demand of the operation permission A is received from the smartphone 1. It may be determined whether the demand of the operation permission A is received, according to a determination whether a signal input to demand the operation permission A is received through the vehicle communicator 21.

When it is determined that the demand of the operation permission A is received ("YES" in step S31), the process proceeds to step S32. When it is determined that the demand of the operation permission A is not received ("NO" in step S31), the process proceeds to step S33. In step S32, the operation permission A, possessed in the in vehicle apparatus 2, is sent to the smartphone 1 through the vehicle communicator 21, and the operation permission A is sent to the smartphone 1, and then the process proceeds to step S33.

In step S33, it is determined whether a vehicle is in driving. A decision whether the vehicle is in driving may be determined by whether a vehicle speed is substantially equal to zero (e.g., less or equal to 5 km/h) according to speed information inputted through an external input I/F 24. When it is determined that the vehicle is in driving ("YES" in step S33), the process proceeds to step S34. When it is determined that the vehicle is not in driving ("NO" in step S33), the process proceeds to step S36.

In step S34, it is determined whether the operation permission B has been transmitted to the smartphone 1. For example, it may be determined that the operation permission B has been transmitted to the smartphone 1 in a case where the operation permission B is not stored in a memory region of the RAM or the like, corresponding to the storing portion of the operation permission B. When it is determined that the operation permission B is transmitted ("YES" in step S34), the process returns to step S31 to repeat the flow. When it is determined that the operation permission B is not transmitted ("NO" in step S34), the process proceeds to step S35.

In step S35, the operation permission B, possessed in the in-vehicle apparatus 2, is sent to the smartphone 1 through the vehicle communicator 21, and the operation permission B is transmitted to the smartphone 1, and then the process returns to step S31 to repeat the flow.

In step S36, it is determined, in a similar manner to step S35, whether the operation permission B has been transmitted to the smartphone 1. When it is determined that the operation permission B is transmitted ("YES" in step S36), the process proceeds to step S37. When it is determined that the operation permission B is not transmitted ("NO" in step S36), the process returns to the step S31 to repeat the flow.

In step S37, a signal for demanding the operation permission B is sent to the smartphone 1 through the vehicle communicator 21, and the smartphone 1 is controlled to return the operation permission B. The operation permission B, returned from the smartphone 1, is obtained through the vehicle communicator 21.

Next, a detail of a handover of the operation permission A and the operation permission B, and authorization of the operation in the in-vehicle apparatus 2 will be described with reference to FIG. 6. FIG. 6 is a flowchart illustrating an example of a flow in the controller 25 of the in-vehicle apparatus 2. It is postulated that the flow in FIG. 6 starts when the smartphone 1 and the in-vehicle apparatus 2 are connected and when the use in the terminal mode starts, and that the flow in FIG. 6 is completed when the use in the terminal mode ends. In addition, in the flow in the FIG. 6, it is postulated that the in-vehicle apparatus 2 in a default setting condition can not receive an operation from the user and can not perform a process according to the user operation, (i.e., the in-vehicle apparatus 2 can not execute the operation).

Firstly, in step S51, it is determined whether the operation input (i.e., the user operation) is performed by the user to the in-vehicle apparatus 2. It may be determined whether the user operation is performed, according to a signal from the operation input portion 23. When it is determined that the user operation is performed ("YES" in step S51), the process proceeds to step S2. When it is determined that the user operation is not performed ("NO" in step S51), the process repeats the flow of the step S51.

In step S52, it is determined whether the operation permission A has been transmitted to the smartphone 1. For example, it may be determined that the operation permission A has been transmitted to the smartphone 1 in a case where the operation permission A is not stored in a memory region of a RAM or the like, corresponding to a storing portion of the operation permission A. When it is determined that the operation permission A is transmitted ("YES" in step S52), the process returns to step S51 to repeat the flow. When it is determined that operation permission A is not transmitted ("NO" in step S52), the process proceeds to step S53.

In step S53, it is determined whether the operation permission B has been transmitted to the smartphone 1. For example, it may be determined that the operation permission B has been transmitted to the smartphone 1, in a case where the operation permission B is not stored in a memory portion of a RAM or the like corresponding to a storing portion of the operation permission B. When it is determined that the operation permission B is transmitted ("YES" in step S53), the process returns to step S51 to repeat the flow. When it is determined that the operation permission B is not transmitted ("NO" in step S53), the process proceeds to step S54. In step S54, the user operation to the operation input portion 23 is received, a process is performed according to the user operation, and the process returns to step S51 to repeat the flow.

According to the above configuration, in a case where communication between the smartphone 1 and the in vehicle apparatus 2 is established and the vehicle is not in driving, when one of the smartphone 1 or the in-vehicle apparatus 2, in which the input operation has been performed prior to the other of the smartphone 1 or the in-vehicle apparatus 2, is in operation, only the one of the smartphone 1 or the in-vehicle apparatus 2, which is operated prior to the other of the smartphone 1 or the in-vehicle apparatus 2, is operable (in other words, in a case where one apparatus is in operation, when the other apparatus is operated, only the one apparatus, which is operated prior to the other apparatus, is operable). Even when two persons simultaneously operate the smartphone 1 and the in-vehicle apparatus 2 respectively, only one of the smartphone 1 or the in-vehicle apparatus 2, which is operated prior to the other of the smartphone 1 or the in-vehicle apparatus 2, is operable. It is possible to prevent a false operation due to simultaneous operations by two persons. In addition, in a case where a vehicle is in driving, and in communication connection, since only the smartphone 1 is operable, it is possible to prevent a false operation due to simultaneous operations by two persons regardless of a vehicle driving state.

Incidentally, for example, in an operation of the button image of the touch panel, the term "in operation" described above denotes a period from a time when a process that is set to the button image of the touch panel starts to a time when the process ends. In case of a mechanical switch, for example, the term "in operation" denotes a period from a start to an end of a process performed in a single switch operation.

Furthermore, in a case where the vehicle is in driving, the operation by the driver is restricted, and it is possible to prevent from disturbing concentration on a driving operation, since the in-vehicle apparatus 2 is not operable. In addition, in a case where communication between the smartphone 1 and the in-vehicle apparatus 2 is established and the vehicle is in driving, since the smartphone 1 is operable, it is possible that an occupant other than the driver operates the smartphone 1 to display the screen image of the smartphone 1 on the in-vehicle apparatus 2 so that convenience to the occupant is not reduced.

Advantage according to the present disclosure will be specifically described with reference to FIG. 7A, FIG. 7B, FIG. 7C and FIG. 7D. FIG. 7A, FIG. 7B, FIG. 7C and FIG. 7D are schematic diagrams to describe advantages according to the present disclosure. Incidentally, in examples of FIG. 7A, FIG. 7B, FIG. 7C and FIG. 7D, communication between the smartphone 1 and the in-vehicle apparatus 2 is established.

Figure 7A:
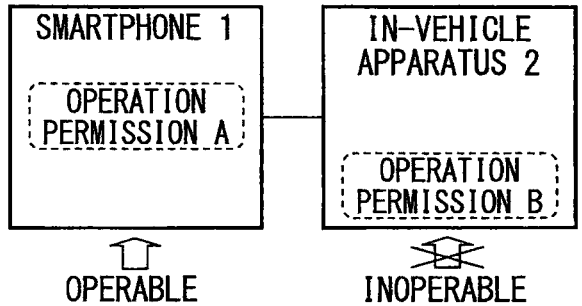
FIG. 7A, FIG. 7B, FIG. 7C and FIG. 7D are schematic diagrams to describe effects of the present disclosure.
Figure 7B:
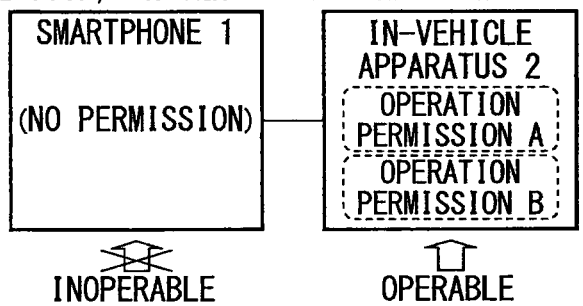
Figure 7C:
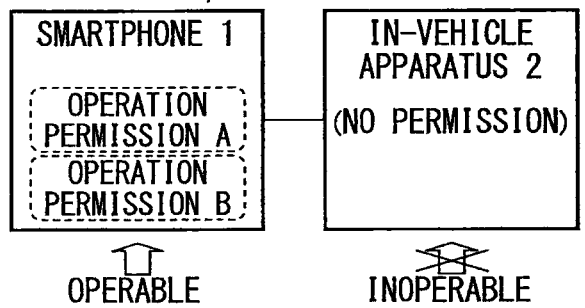
Figure 7D:
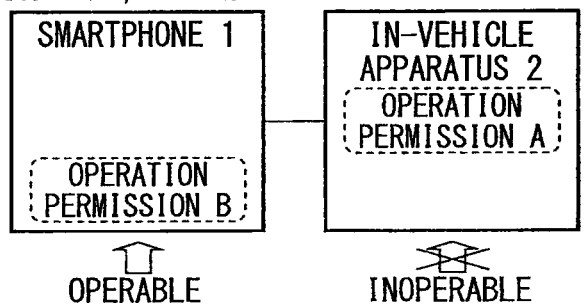

When a vehicle is not in driving (i.e., in stopping or parking) and an operation input is performed to the smartphone 1, only the smartphone is operable, since the smartphone 1 has the operation permission A and the in-vehicle apparatus 2 has the operation permission B (referring to FIG. 7A). When a vehicle stops, and the operation input is performed to the in-vehicle apparatus 2, only the in-vehicle apparatus 2 is operable, since the in-vehicle apparatus 2 has both of the operation permission A and the operation permission B (referring to FIG. 7B).

Furthermore, when a vehicle is in driving, and the operation input is performed to the smartphone 1, only the smartphone 1 is operable, since the smartphone 1 has the operation permission A and the operation permission B. Furthermore, when the vehicle is in driving and the operation input is performed to the in-vehicle apparatus 2, only the smartphone 1 is operable since the smartphone 1 has the operation permission B and the in-vehicle apparatus 2 has the operation permission A.

Figure 8:
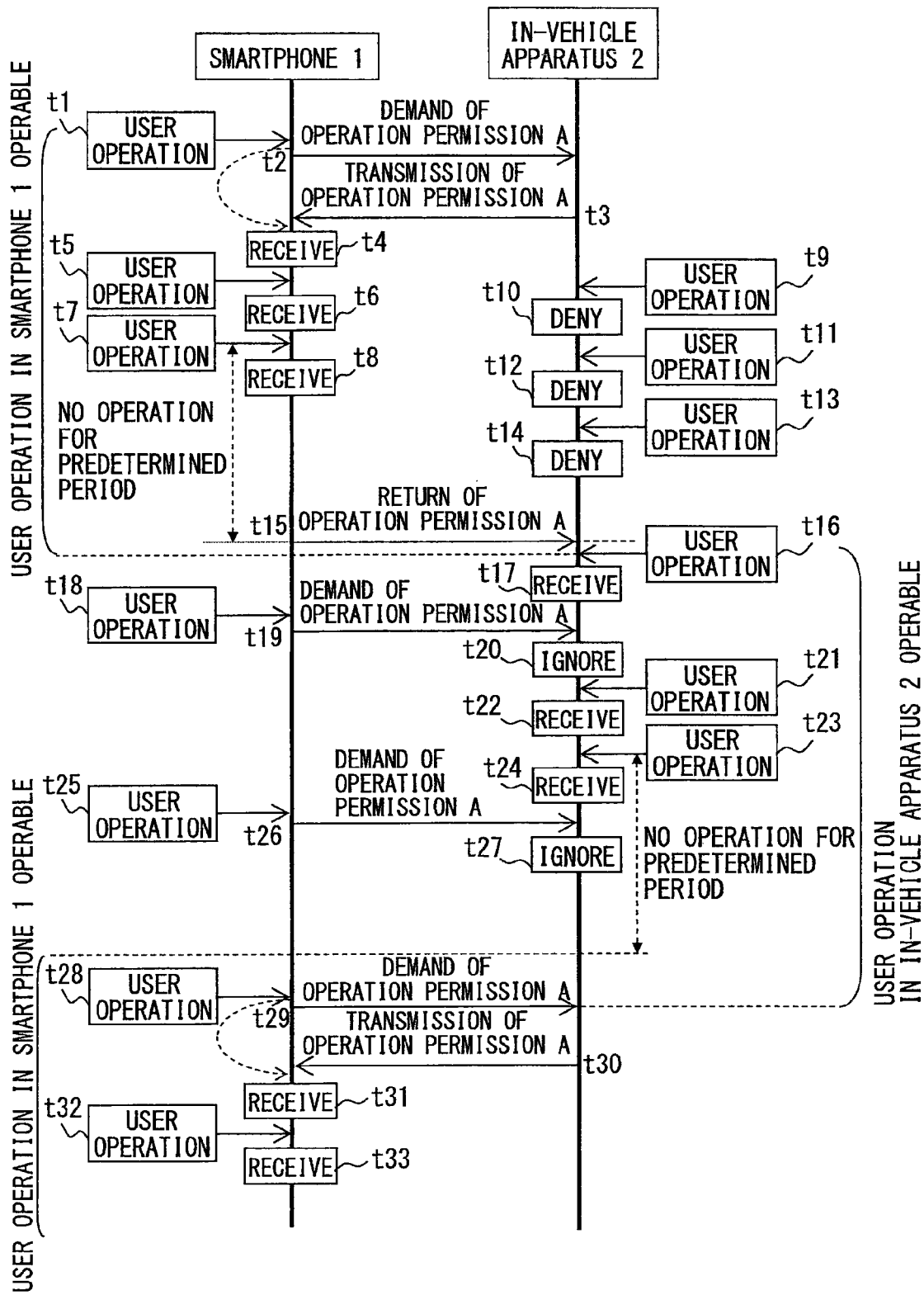
FIG. 8 is a sequence diagram illustrating an example of an operation and a process in the information presentation system in stopping or parking.
Figure 9:
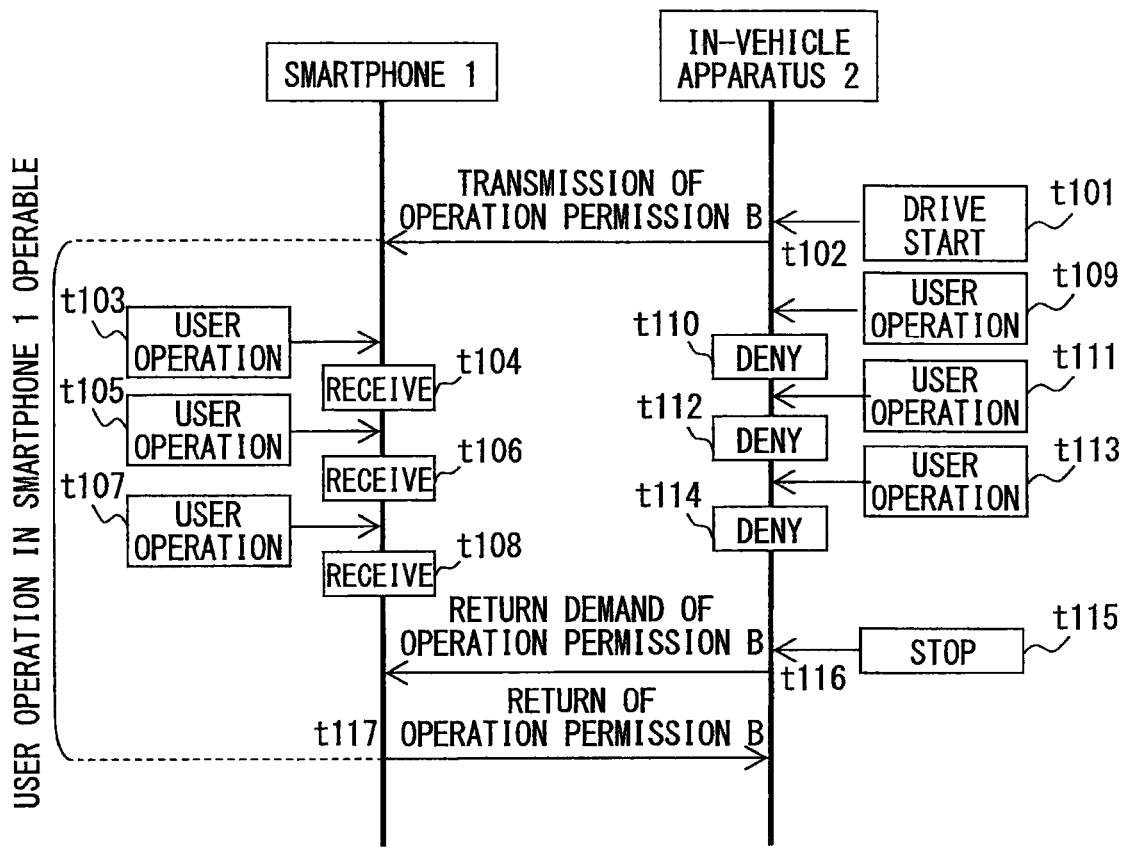
FIG. 9 is a sequence diagram illustrating an example of an operation and a process in the information presentation system from a start of driving to a stop.

Next, advantages according to the present disclosure will be further described with reference to FIG. 8 and FIG. 9. Herein, it is postulated that the driver and an occupant other than the driver are in a vehicle and that the occupant has the smartphone 1 on one's hand. The smartphone 1 is connected to the in-vehicle apparatus 2 in the terminal mode. A situation where, in order to execute an application (a music play or the like) of the smartphone 1, the driver performs an operation input to the in vehicle apparatus 2, and the occupant performs an operation input to the smartphone 1 in order to execute an application, will be described. FIG. 8 is a sequence diagram illustrating an example of an operation and a process in the information presentation system 100 while stopping or parking a vehicle. FIG. 9 is a sequence diagram illustrating an example of an operation and a process in the information presentation system 100 from a time when the vehicle starts to drive to a time when the vehicle stops.

Firstly, an example of the operation and a process in the information presentation system 100, when the vehicle is stopped or parked, will be described with reference to FIG. 8. Incidentally, in the example of FIG. 8, the in-vehicle apparatus 2 keeps possessing the operation permission B since the vehicle is in stopping or parking.

In a case where the user operation to the smartphone 1 is performed prior to the user operation to the in-vehicle apparatus 2 (t1), a signal for demanding the operation permission A is sent from the smartphone 1 to the in-vehicle apparatus 2 (t2). Next, the in-vehicle apparatus 2 receives the demand of the operation permission A from the smartphone 1, and the in-vehicle apparatus 2 transmits the operation permission A to the smartphone 1 (t3). The smartphone 1 with the operation permission A can perform the user operation so that the smartphone 1 receives the operation input (t4).

In the smartphone 1, which can perform the user operation, the operation input by the user operation (t5, t7) is received successively (t6, t8) while the user operation is performed continuously. On the other hand, the in-vehicle apparatus 2, which transmits the operation permission A to the smartphone 1, can not perform the user operation since the in-vehicle apparatus 2 only has the operation permission B. Therefore, the operation input by the user operation (t9, t11, t13) is denied successively (t10, t12, t14). Thus, only the occupant can perform the operation since the operation input is not received through the in-vehicle apparatus 2.

Subsequently, the operation permission A is returned from the smartphone 1 to the in-vehicle apparatus 2 (t15), in a case where the user operation to the smartphone 1 is not performed for a predetermined period (e.g., 5 seconds or the like). When the operation permission A is returned from the smartphone 1 to the in-vehicle apparatus 2, the in-vehicle apparatus 2 has the operation permission A and the operation permission B, and the in-vehicle apparatus 2 can perform the user operation.

In a case where the in-vehicle apparatus 2 can perform the user operation, when the user operation to the in-vehicle apparatus 2 is performed prior to the user operation to the smartphone 1 (t16), the in-vehicle apparatus 2 receives the operation input by the user operation (t17). In a case where the user operation to the smartphone 1 is performed after the user operation to the in-vehicle apparatus 2 (t18), even when a signal for demanding the operation permission A is sent from the smartphone 1 to the in-vehicle apparatus 2 (t19), the in-vehicle apparatus 2 ignores the signal (t20).

In the in-vehicle apparatus 2, which can perform the user operation, the operation input by the user operation (t21, t23) is received successively (t22, t24) while the user operation is performed continuously. On the other hand, until the user operation to the in-vehicle apparatus 2 is not performed for a predetermined period (e.g., 5 seconds or the like), even when a signal for demanding the operation permission A is sent (t26) from the smartphone 1 to the in-vehicle apparatus 2 according to the user operation (t25) of the smartphone 1, the in-vehicle apparatus 2 ignores the signal (t27). Thus, only the driver can perform the operation since the operation input from the smartphone 1 is not received.

It is postulated that, subsequently, the user operation to the smartphone 1 is performed prior to the user operation to the in-vehicle apparatus 2 (t28), when the user operation to the smartphone 1 is not performed for a predetermined period (e.g., 5 seconds or the like). In this case, the signal for demanding the operation permission A is sent (t29) from the smartphone 1 to the in-vehicle apparatus 2, and the in-vehicle apparatus 2 transmits the operation permission A to the smartphone 1 (t30). The smartphone 1 with the operation permission A receives the operation input (t31) since the smartphone 1 can perform the user operation. After that, similar to the above processes, the operation input by the user operation (t32) is received successively (t33) while the user operation to the smartphone 1 is performed continuously.

Next, an example of the operation and the process in the information presentation system 100, in a case where the vehicle is stopped or parked, will be described with reference to FIG. 9.

When a vehicle starts to drive (t101), the in-vehicle apparatus 2 transmits the operation permission B to the smartphone 1 (t102). The smartphone 1 with the operation permission B can perform the user operation. The smartphone 1, which can perform the user operation, successively receives the operation input (t104, t106, t108) by the user operation (t103, t105, t107).

On the other hand, the in-vehicle apparatus 2, which transmits the operation permission B to the smartphone 1, does not have at least the operation permission B, and the in-vehicle apparatus 2 can not perform the user operation. Therefore, the operation input by the user operation (t109, t111, t113) is denied continuously (t110, t112, t114). Thus, only an occupant can perform the operation since the operation input is not received from the in-vehicle apparatus 2.

Subsequently, when the vehicle stops (t115), a signal for demanding a return of the operation permission B is sent from the in-vehicle apparatus 2 to the smartphone 1 (t116). The smartphone 1 returns the operation permission B to the in-vehicle apparatus 2 (t117), when the smartphone 1 receives the demand of a return of the operation permission B from the in-vehicle apparatus 2.

Incidentally, although the operation permission A and the operation permission B are described in the above embodiment, it is not limited to the configuration. For example, instead of using the operation permission A and the operation permission B, the operation permission A and information (hereinafter, a prohibition information), indicating prohibition to receive an operation from the user may be used. In this case, the smartphone 1 is operable when the smartphone 1 has the operation permission A. The in-vehicle apparatus 2 is operable when the in vehicle apparatus 2 has the operation permission A and do not have the prohibition information. Incidentally, the operation information A corresponds to a permission information.

The in-vehicle apparatus 2 produces the prohibition information and possesses it when a vehicle is in driving. Meanwhile, the prohibition information is deleted when the vehicle is not in driving. For example, the prohibition information is presented by a flag. In the present embodiment, the flag indicating prohibition to receive an operation from the user (hereinafter, a prohibition flag C) is set when a vehicle is in driving. The prohibition flag C is reset when the vehicle is not in driving.

According to the above configuration, when a vehicle is not in driving, in communication connection, and when the smartphone 1 receives the operation input, only the smartphone 1 is operable, since the smartphone 1 has the operation permission A and the in-vehicle apparatus 2 does not have an operation permission. When the vehicle is not in driving, in communication connection, and when the in-vehicle apparatus 2 receives the operation input, only the in-vehicle apparatus 2 is operable, since the in-vehicle apparatus 2 has the operation permission A and the prohibition flag C is reset (i.e., the in-vehicle apparatus 2 does not have the prohibition information) and the smartphone 1 does not have the operation permission A.

Furthermore, when the vehicle is in driving, in communication connection, and when the smartphone 1 receives the operation input, only the mobile terminal is operable, since the smartphone 1 has the operation permission A and the in-vehicle apparatus A does not have the operation permission A. When the vehicle is in driving, in communication connection, and when the in-vehicle apparatus 2 receives the operation input, the in-vehicle apparatus 2 is not operable, since the in vehicle apparatus 2 has the operation permission A and the prohibition flag C is set (i.e., the in-vehicle apparatus 2 has the prohibition information). The smartphone 1 is not operable since the smartphone 1 does not have the operation permission A.

Therefore, according to the above configuration, it is also possible to prevent the false operation due to simultaneous operations by two persons in the smartphone 1 and the in-vehicle apparatus 2, in a case where the smartphone 1 and the in-vehicle apparatus 2 are connected and the screen image of the smartphone 1 is displayed on the in-vehicle apparatus 2. In addition, it is possible to prevent from disturbing concentration on the driving operation, and to preserve convenience to occupants.

In the above described embodiment, although the smartphone 1 and the in vehicle apparatus 2 collaborate, more especially using the operation permission A and the operation permission B, to prevent the false operation caused by simultaneous operations, it is not limited to this configuration. For example, the false operation may be prevented by only the in-vehicle apparatus 2. For example, the in-vehicle apparatus 2 may estimate that the user performs an operation input to the smartphone 1, such that a false operation of simultaneous operations may be prevented. Specifically, the in-vehicle apparatus 2 may analyze a mobile-phone-derived image data, which is received from the smartphone 1. For example, in a case where an operation screen image is changed regardless of no operation input through the operation input portion 23 of the in-vehicle apparatus 2, the in-vehicle apparatus 2 may estimate that an operation input is performed by the user to the smartphone 1, and may cancel an operation input from the operation input portion 23 of the in-vehicle apparatus 2 for the predetermined period.

According to this configuration, it is possible that the operation of the in-vehicle apparatus 2 is prohibited by only the in-vehicle apparatus 2 when the smartphone 1 performs an operation. Even when the smartphone 1 is non-compliant to the in vehicle apparatus 2 and it is difficult for the in-vehicle apparatus 2 and the smartphone 1 to manage an operation authority cooperatively with each other, it is possible to restrict the false operation by simultaneous operations. In addition, the in-vehicle apparatus 2, according to a state of the smartphone 1, may select two configurations. In a first configuration, the in-vehicle apparatus 2 and the smartphone 1 collaborate to control an operation to be valid or invalid. In a second configuration, only the in-vehicle apparatus 2 controls the operation to be valid or invalid.

Furthermore, the false operation may be prevented by only the smartphone 1. For example, the operation detected by the operation detector 13 of the smartphone 1 has a priority to be adopted normally, and a position information, corresponding to the operation information received from the in-vehicle apparatus 2, is not adopted. On the other hand, only when the in-vehicle apparatus 2 is operated (or until a predetermined period has elapsed after receiving the position information from the in-vehicle apparatus 2), the information presentation system 100 may give a priority to the in-vehicle apparatus 2 to adopt the operation received from the in-vehicle apparatus 2, and may cancel the operation detected through the operation detector 13 of the smartphone 1.

According to the above configuration, it is possible that an operation of the in vehicle apparatus 2 is prohibited by only the smartphone 1, while the smartphone 1 performs an operation. Even when there is no action in the in-vehicle apparatus 2, it is possible that a change only in the smartphone 1 restricts a false operation by simultaneous operations.

Incidentally, in the above described embodiment, although the in-vehicle apparatus 2 only manages operation permissions, it is not limited to this configuration. For example, the smartphone 1 may manage the operation permissions. For example, the smartphone 1 may manage an operation permission C instead of the above operation permission A, managed by the in-vehicle apparatus 2 (hereinafter, in a first modified embodiment). The first modified embodiment will be described below. Incidentally, to simplify a description, the same symbols are assigned to portions identical to portions illustrated in figures and described in the above embodiment, and an explanation will be skipped.

In the first modified embodiment, it is postulated that there are two kinds of the operation permissions: the operation permission B and the operation permission C. The operation permission B is similar to the above descried operation permission B. When the user operates the in vehicle apparatus 2, the in-vehicle apparatus 2 demands the operation permission C for the smartphone 1 and receives it. The operation permission C is returned to the smartphone 1 after the operation is completed.

Incidentally, for example, in an operation of the button image of the in vehicle touch panel, a time when the operation ends denotes a time when a process, set to the button image, ends. The process, set to the button image, may include a process from the operation of the button image to an operation of another button image. In addition, the process, set to the button image, may be a bunch of processes including an operation of another button image in a case where the operation of the button image is performed. For example, in a destination setting operation, in a case where the button image is operated to set the destination, the process corresponds to a bunch of processes, including the operation of the button image to input the Japanese syllabary of a destination until completion of the destination setting operation.

Furthermore, a handover of the operation permission B and a handover of the operation permission C are performed independently each other. The operation permission B and the operation permission C correspond to the permission information described above.

The smartphone 1 is operable when the smartphone 1 has at least one of the operation permission B or the operation permission C. The in-vehicle apparatus 2 is operable when the in-vehicle apparatus 2 has both of the operation permission B and the operation permission C.

Figure 10:
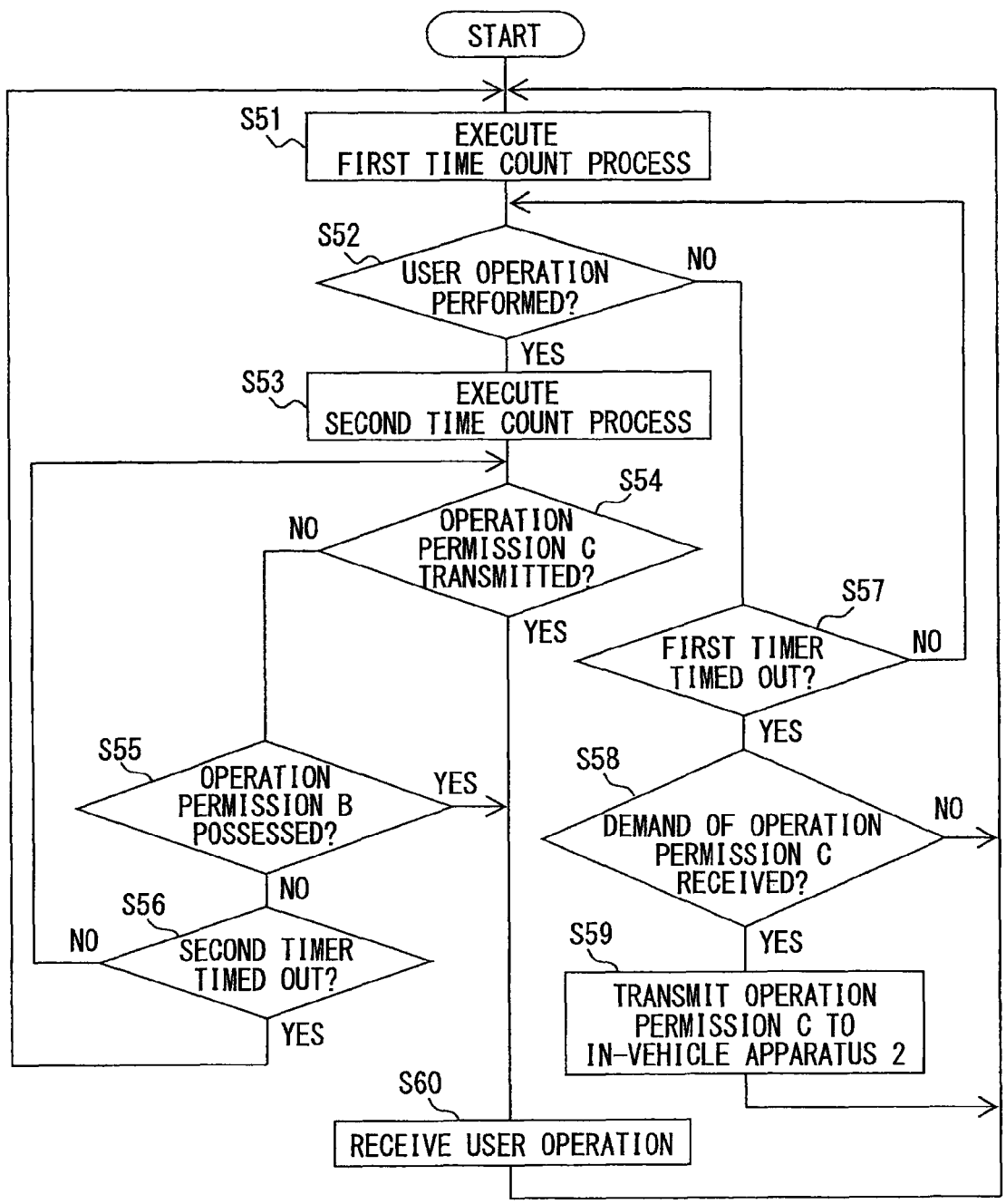
FIG. 10 is a flowchart illustrating an example of a flow in the main controller of the smartphone in a first modified example.
Figure 11:
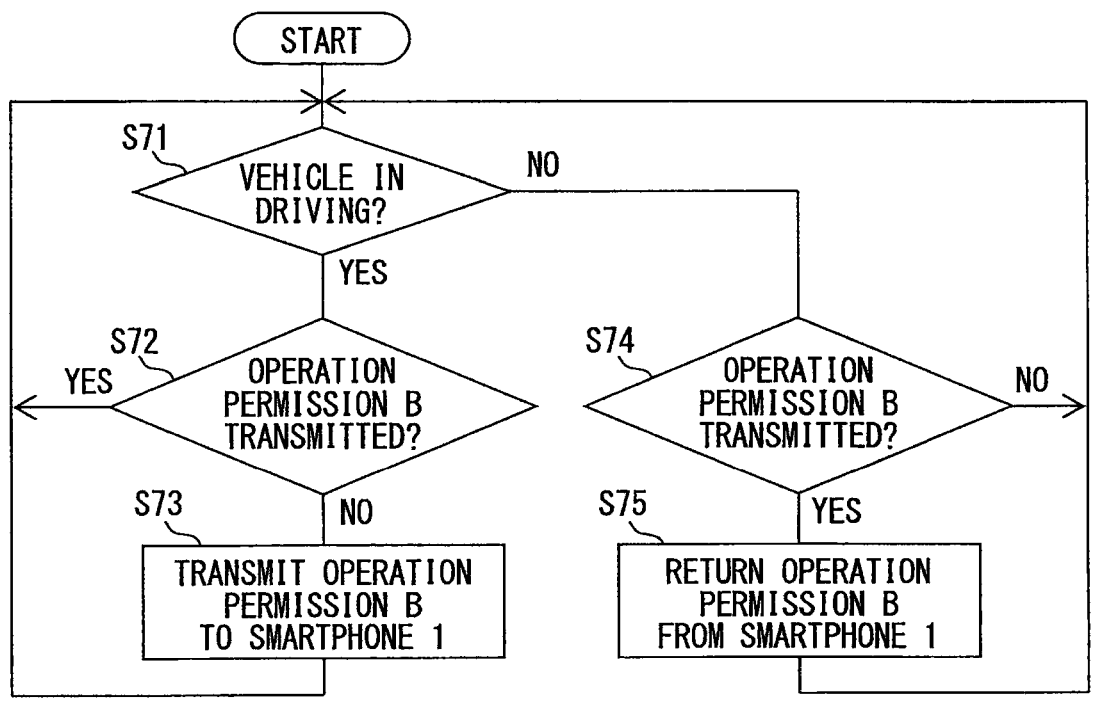
FIG. 11 is a flowchart illustrating an example of a management flow of an operation permission B of the in-vehicle apparatus in the first modified example.
Figure 12:
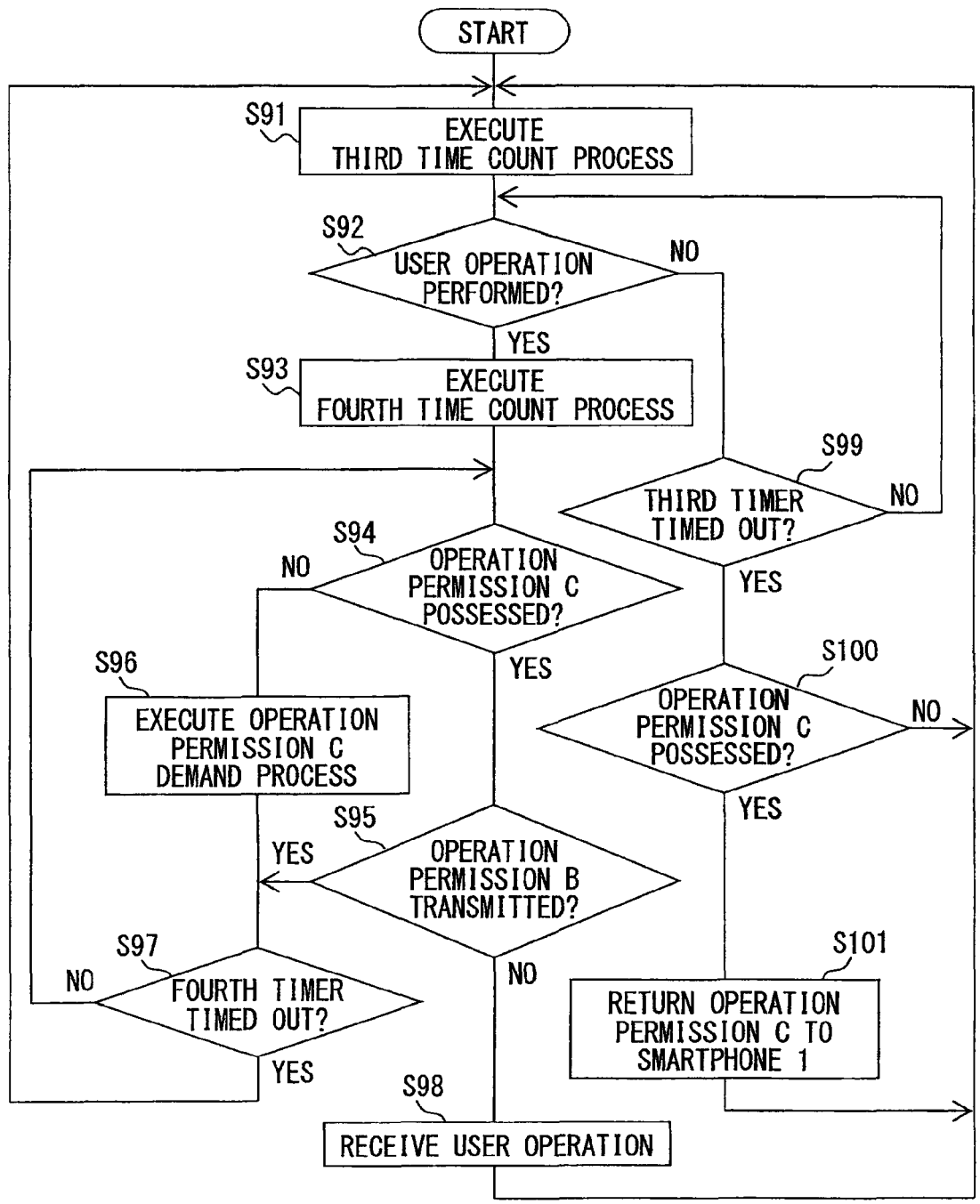
FIG. 12 is a flowchart illustrating an example of a flow in a controller of the in-vehicle apparatus in the first modified example.

A detail of a handover of the operation permission B and management of the operation permission C between the smartphone 1 and the in-vehicle apparatus 2, and authorization of an operation will be described with reference to FIG. 10 to FIG. 12. Firstly, a detail of a handover of the operation permission B, a handover and management of the operation permission C in the smartphone 1, and authorization of an operation will be described with reference to FIG. 10. FIG. 10 is a flowchart illustrating an example of a flow in the main controller 16 of the smartphone 1 in the first modified embodiment. It is postulated, for example, that the flow in FIG. 10 starts when the smartphone 1 and the in-vehicle apparatus 2 are connected and when the use in the terminal mode starts, and that the flow is completed when the use in the terminal mode ends. In addition, in the flow in the FIG. 10, it is postulated that the smartphone 1 in a default setting condition can not receive an operation from the user and can not perform a process according to the user operation (i.e., the smartphone 1 can not execute the operation).

The smartphone 1 produces the operation permission C when, for example, the use in the terminal mode starts. The operation permission C is stored in a memory region of a RAM or the like corresponding to a storing portion of the operation permission C. When the use in the terminal mode ends, the operation permission C is deleted from the storing portions.

In step S51, similar to step S1, a first time count process is performed and the process proceeds to step S52. In step S52, similar to step S2, it is determined whether the user operation is performed to the smartphone 1. When it is determined that the user operation is performed ("YES" in step S52), the process proceeds to step S53. When it is determined that the user operation is not performed ("NO" in step S52), the process proceeds to step S57. In step S53, similar to step S3, a second time count process is performed and the process proceeds to step S54.

In step S54, it is determined whether the operation permission C has been transmitted to the in-vehicle apparatus 2. For example, it may be determined that the operation permission C has been transmitted to the in-vehicle apparatus 2, in a case where the operation permission C is not stored in a memory region of a RAM or the like which corresponds to a storing portion of the operation permission C. When it is determined that the operation permission C is transmitted ("YES" in step S54), the process proceeds to step S55. When it is determined that the operation permission C is not transmitted ("NO" in step S54), the process proceeds to step S60.

In step S55, similar to step S7, it is determined whether the operation permission B is possessed. When it is determined that the operation permission B is possessed ("YES" in step S55), the process proceeds to step S60. When it is determined that the operation permission B is not possessed ("NO" in step S55), the process proceeds to step S56.

In step S56, similar to step S8, it is determined whether the second timer is timed out. When it is determined that the second timer is timed out ("YES" in step S56), the process returns to step S51 to repeat the flow. When it is determined that the second timer is not timed out ("NO" in step S56), the process returns to step S54 to repeat the flow.

In step S57, similar to step S9, it is determined whether the first timer is timed out. When it is determined that the first timer is timed out ("YES" in step S57), the process proceeds to step S58. When it is determined that the first timer is not timed out ("NO" in step S57), the process returns to step S52 to repeat the flow.

In step S58, it is determined whether a demand of the operation permission C is received from the in-vehicle apparatus 2. It may be determined whether the demand of the operation permission C is received from the in-vehicle apparatus 2, according to a determination whether a signal input demanding the operation permission C is received through the mobile communicator 11. When it is determined that the demand of the operation permission C is received ("YES" in step S58), the process proceeds to step S59. When it is determined that the demand of the operation permission C is not received ("NO" in step S58), the process returns to step S51 to repeat the flow.

In step S59, the operation permission C, possessed in the smartphone 1, is sent to the in-vehicle apparatus 2 through the mobile communicator 11, and the operation permission C is transmitted to the in-vehicle apparatus 2, and the process returns to step S51 to repeat the flow. In step S60, the user operation is received through the touch panel portion 14, and the process according to the user operation is performed, and the process returns to step S51 to repeat the flow.

Next, a detail of management of the operation permission B in the in-vehicle apparatus 2 will be described with reference to FIG. 11. FIG. 11 is a flowchart illustrating a management flow of the operation permission B in the controller 25 of the in-vehicle apparatus 2 in the first modified embodiment. The flow in the FIG. 11 starts when the smartphone 1 and the in vehicle apparatus 2 are connected and when the use in the terminal mode starts. The flow in FIG. 5 is completed when the use in the terminal mode ends.

The in-vehicle apparatus 2 produces, for example, the operation permission B when the use in the terminal mode starts. The operation permission B is stored in a memory region of a RAM or the like corresponding to a storing portion of the operation permission B. When the use in the terminal mode ends, the operation permission B is deleted from the storing portions.

In step S71, similar to step S33, it is determined whether a vehicle is in driving. When it is determined that the vehicles is in driving ("YES" in step S71), the process proceeds to step S72. When it is determined that the vehicle is not in driving ("NO" in step S71), the process proceeds to step S74.

In step S72, similar to step S34, it is determined whether the operation permission B has been transmitted to the smartphone 1. When it is determined that the operation permission B is transmitted ("YES" in step S72), the process returns to step S71 to repeat the flow. When it is determined that the operation permission B is not transmitted ("NO" in step S72), the process proceeds to step S73.

In step S73, the operation permission B, possessed in the in-vehicle apparatus 2, is sent to the smartphone 1 through the vehicle communicator 21. The operation permission B is transmitted to the smartphone 1. The process returns to step S71 to repeat the flow.

In step S74, similar to step S36, it is determined whether the operation permission B has been transmitted to the smartphone 1. When it is determined that the operation permission B is transmitted ("YES" in step S74), the process proceeds to step S75. When it is determined that the operation permission B is not transmitted ("NO" in step S74), the process returns to the step S71 to repeat the flow.

In step S75, a signal for demanding the operation permission B is sent to the smartphone 1 through the vehicle communicator 21, and the smartphone 1 is controlled to return the operation permission B. The operation permission B, which is returned from the smartphone 1, is obtained through the vehicle communicator 21.

Next, a detail of a handover of the operation permission B and the operation permission C and an authorization of the operation in the in-vehicle apparatus 2 will be described with reference to FIG. 12. FIG. 12 is a flowchart illustrating an example of a flow in the controller 25 of the in-vehicle apparatus 2 in the first modified embodiment. It is postulated that the flow in FIG. 12 starts when the smartphone 1 and the in-vehicle apparatus 2 are connected and the use in the terminal mode starts, and that the flow in FIG. 12 is completed when the use in the terminal mode ends. In addition, in the flow in the FIG. 12, it is postulated that the in-vehicle apparatus 2 in a default setting condition can not receive an operation from the user and can not perform the process according to the user operation (i.e., the in-vehicle apparatus 2 can not execute the operation).

Firstly, in step S91, a third time count process is performed and the process proceeds to step S92. In the third time count process, a count of a third timer is initialized to start counting. The third timer may be, for example, an unshown timer circuit or the like provided in the controller 25.

In step S92, similar to step S51, it is determined whether the user input is performed to the in-vehicle apparatus 2. When it is determined that the user operation is performed ("YES" in step S92), the process proceeds to step S93. When it is determined that the user operation is not performed ("NO" in step S92), the process repeats a flow of the step S99.

In step S93, a fourth time count process is performed and the process proceeds to step S94. In the fourth time count process, a count of a fourth timer is initialized to start counting. The fourth timer may be, for example, an unshown timer circuit or the like provided in the controller 25.

In step S94, it is determined whether the operation permission C is possessed. It may be determined whether the operation permission C is possessed, according to a determination whether the operation permission C is stored in a memory region of a RAM or the like, corresponding to a storing portion of the operation permission C. When it is determined that the operation permission C is possessed ("YES" in step S94), the process proceeds to step S95. When it is determined that the operation permission C is not possessed ("NO" in step S94), the process proceeds to step S96.

In step S95, similar to step S53, it is determined whether the operation permission B has been transmitted to the smartphone 1. When it is determined that the operation permission B is transmitted ("YES" in step S95), the process proceeds to step S97. When it is determined that the operation permission B is not transmitted ("NO" in step S95), the process proceeds to step S98.

In step S96, a demand process of the operation permission C is performed, and the process proceeds to step S97. In the demand process of the operation permission C, a signal for demanding the operation permission C is sent to the smartphone 1 through the vehicle communicator 21, and the operation permission C is sent from the smartphone 1. The operation permission C, sent from the smartphone 1, is obtained through the vehicle communicator 21.

In step S97, it is determined whether the fourth timer is timed out. It may be determined whether the fourth timer is timed out, according to a determination whether a count of the fourth timer is more or equal to a predetermined value. Incidentally, the predetermined value described above is a value which can be set arbitrarily and, for example, corresponds to a count value for some seconds.

When it is determined that the fourth timer is timed out ("YES" in step S97), the process returns to step S91 to repeat the flow. When it is determined that the fourth timer is not timed out ("NO" in step S97), the process returns to step S94 to repeat the flow.

In step S98, the user operation to the operation input portion 23 is received, and the operation is performed according to the user operation, and then the process returns to step S91 to repeat the flow.

In step S99, it is determined whether the third timer is timed out. It may be determined whether the third timer is timed out, according to a determination whether a count of the third timer is more or equal to a predetermined value. Incidentally, the predetermined value herein is a value which can be set arbitrarily and, for example, corresponds to a count value for some seconds.

When it is determined that the third timer is timed out ("YES" in step S99), the process proceeds to step S100. When it is determined that the third timer is not timed out ("NO" in step S99), the process returns to step S92 to repeat the flow.

In step S100, similar to step S94, it is determined whether the operation permission C is possessed. When it is determined that the operation permission C is possessed ("YES" in step S100), the process proceeds to step S101. When it is determined that the operation permission C is not possessed ("NO" in step S100), the process returns to step S91 to repeat the flow. In step S101, the operation permission C, possessed in the in-vehicle apparatus 2, is sent to the smartphone 1 through the vehicle communicator 21, and the operation permission C is returned to the smartphone 1, and then the process returns to step S91 to repeat the flow.

According to the above configuration, similar to the above described embodiment, even when two persons simultaneously operate the smartphone 1 and the in-vehicle apparatus 2, respectively, only one of the smartphone 1 or the in-vehicle apparatus 2, which is operated prior to the other of the smartphone 1 or the in vehicle apparatus 2, is operable, and it is possible to prevent the false operation due to simultaneous operations by two persons. In addition, since only the smartphone 1 is operable, in a case where a vehicle is in driving, and in communication connection, it is possible to prevent the false operation due to simultaneous operations by two persons regardless of a vehicle driving state.

Although a so-called touch panel mobile phone is used as the mobile terminal in the above embodiment, it is not limited to the configuration. The so-called touch panel mobile phone performs an operation input with a touch panel. For example, another mobile terminal, such as a mobile phone or a PDA may be used as a mobile terminal.

According to the above information presentation system, in a case where communication between the mobile terminal and the in-vehicle apparatus has been established (hereinafter, in communication connection), when one of the mobile terminal or the in-vehicle apparatus, in which the input operation has been performed prior to the other of the mobile terminal or the in-vehicle apparatus, is in operation, only the one of the mobile terminal or the in-vehicle apparatus, which is operated prior to the other of the mobile terminal or the in-vehicle apparatus, is operable. Thus, even when two persons simultaneously operate the mobile terminal and the in-vehicle apparatus, respectively, only the one of the mobile terminal or the in vehicle apparatus, which is operated prior to the other of the mobile terminal or the in-vehicle apparatus, is operable and it is possible to prevent the false operation due to simultaneous operations by two persons.

When communication between the in-vehicle apparatus and the mobile terminal is established and when the vehicle is in driving, the in-vehicle apparatus may be inoperable and the mobile terminal may be operable. According to the above configuration, when the vehicle is in driving, in communication connection, since only the mobile terminal is operable, it is possible to prevent the false operation due to simultaneous operations by two persons regardless of whether the vehicle is in driving. Furthermore, when the vehicle is in driving, the operation by the driver with driving is inoperable so that it is possible to prevent from disturbing concentration on the driving operation, since the in-vehicle apparatus is not operable. In addition, when the vehicle is in driving, in communication connection, since the mobile terminal is operable, it is possible that an occupant other than the driver operates the mobile phone to display the screen image of the mobile terminal on the in vehicle apparatus, and convenience to the occupant is not reduced.

In a case where communication between the in-vehicle apparatus and the mobile terminal is established, the in-vehicle apparatus has a first permission information and a second permission information as permission information, indicating permission to receive an operation from the user. The mobile terminal obtains the first permission information stored in the in-vehicle apparatus through the mobile communicator, in a case where the mobile terminal receives an operation input from the user to a mobile operation input portion. After the process according to the operation input is completed, the mobile terminal returns the first permission information to the in-vehicle apparatus through the mobile communicator. The in-vehicle apparatus transmits the stored second permission information to the mobile terminal through the vehicle communicator when the vehicle is in driving. When the vehicle is not in driving, the in-vehicle apparatus receives the second permission information from the mobile terminal through the vehicle communicator. In a case where communication between the in-vehicle apparatus and the mobile terminal is established and when the in-vehicle apparatus has both of the first permission information and the second permission information, the in-vehicle apparatus may be operable, and when the mobile terminal has at least one of the first permission information and the second permission information, the mobile terminal may be operable.

According to the above configuration, when the vehicle is not in driving, in communication connection, and when the mobile terminal receives the operation input, since the mobile terminal has a first permission information and the in-vehicle apparatus has the second permission information, only the mobile terminal is operable. In addition, when the vehicle is not in driving, in communication connection, and when the in-vehicle apparatus receives the operation input, since the in-vehicle apparatus has both of the first permission information and the second permission information, only the in-vehicle apparatus is operable.

Furthermore, when the vehicle is in driving, in communication connection, and when the mobile terminal receives the operation input, since the mobile terminal has the first permission information and the second permission information, only the mobile terminal is operable. When the vehicle is in driving, in communication connection, and when the in-vehicle apparatus receives the operation input, since the mobile terminal has the second permission information and the in vehicle apparatus has the first permission information, only the mobile terminal is operable.

In addition, in a case where communication between the in-vehicle apparatus and the mobile terminal is established, and when the in vehicle apparatus has the permission information, indicating a permission to receive an operation from the user, and when the mobile terminal receives the operation input from the user to the mobile operation input portion, the mobile terminal obtains the permission information stored in the in-vehicle apparatus through the mobile communicator. After a process according to the operation input is completed, the mobile terminal returns the permission information to the in-vehicle apparatus through mobile communicator. When the vehicle is in driving, the in vehicle apparatus produces and possesses a prohibition information which indicates to prohibit receiving the operation from the user. When the vehicle is not in driving, the in-vehicle apparatus deletes the prohibition information. In a case where communication between the in-vehicle apparatus and the mobile terminal is established, the in-vehicle apparatus may be operable when the in-vehicle apparatus has the permission information and does not have the prohibition information, and the mobile terminal may be operable when the mobile terminal has the permission information.

According to the above configuration, in a case where the vehicle is not in driving, in communication connection, and when the mobile terminal receives the operation input, since the mobile terminal has the permission information and the in-vehicle apparatus does not have the permission information, only the mobile terminal is operable. In addition, in a case where the vehicle is not in driving, in communication connection, and when the in-vehicle apparatus receives the operation input, since the in-vehicle apparatus has the permission information and does not have the prohibition information and the mobile terminal does not have the permission information, only the in-vehicle apparatus is operable.

Furthermore, in a case where the vehicle is in driving, in communication connection, and when the mobile terminal receives the operation input, since the mobile terminal has the permission information and the in-vehicle apparatus does not have permission information, only the mobile terminal is operable. Furthermore, in a case where the vehicle is in driving, in communication connection, and when the in vehicle apparatus receives the operation input, since the in-vehicle apparatus has the permission information and the prohibition information and the mobile terminal does not have the permission information, neither the mobile terminal nor the in-vehicle apparatus is operable.

The in-vehicle apparatus estimates whether the operation input is performed to the mobile terminal by the user, based on the image data received from the mobile terminal and on the operation by the user to the vehicle operation input portion. Based on a result of the estimation, while the mobile terminal is operated, the in-vehicle apparatus may cancel the operation input from the vehicle operation input portion.

According to the above configuration, it is possible that the operation of the in vehicle apparatus is prohibited by only the in-vehicle apparatus when the mobile terminal is in operation. Even when the mobile terminal is non-compliant to the in-vehicle apparatus and it is difficult for both of the apparatus to manage the operation permission, it is possible to restrict the false operation due to simultaneous operations performed.

The mobile terminal obtains the vehicle operation information, inputted to the vehicle operation input portion, from the in-vehicle apparatus. The mobile terminal may switch between a first state and a second state. In the first state, the operation which is inputted to the mobile operation input portion is validated and the vehicle operation information is invalidated. The second state is provided exclusively to the first state. In the second state, based on the vehicle operation information, while the in-vehicle apparatus is operated, the vehicle operation information is validated and the operation inputted to the mobile operation input portion is invalidated. According to the above configuration, it is possible that the operation of the in-vehicle apparatus becomes inoperable by only the mobile terminal while the mobile terminal is operated. It is possible that a false operation due to simultaneous operations performed is prevented by a change only in the mobile terminal without a process in the in-vehicle apparatus.

The mobile display portion may be a mobile touch panel that is integrated into at least a part of the mobile operation input portion.

In this case, the vehicle display portion is a vehicle touch panel that is integrated into at least a part of the vehicle operation input portion. The in vehicle apparatus displays the screen image provided by the image data, which is received from the mobile terminal through the vehicle communicator, on the vehicle touch panel. In a case where the user performs the operation to the vehicle touch panel, the in-vehicle apparatus specifies as an operation object region a region on the mobile touch panel corresponding to the screen of the operated vehicle touch panel. The in-vehicle apparatus sends a signal indicating the operation object region to the mobile terminal through the vehicle communicator. In a case where the mobile terminal receives the signal indicating the operation object region from the in-vehicle apparatus through the mobile communicator, the mobile terminal performs the input in a same manner where the operation object region is operated on the mobile touch panel screen.

The in-vehicle apparatus is mounted on a vehicle, and includes the mobile operation input portion to perform the operation input by the user. The in-vehicle apparatus receives the image data from the mobile terminal through a vehicle communicator, the image data which is produced in the mobile terminal so as to be displayed on a screen of the mobile terminal. The vehicle display portion displays a screen image provided by the received image data. In a case where communication between the in-vehicle apparatus and the mobile terminal is established and when a vehicle is not in driving, one of the mobile terminal or the in-vehicle apparatus, in which the input operation has been performed prior to the other of the mobile terminal or the in-vehicle apparatus, is in operation, only the one of the mobile terminal or the in-vehicle apparatus, which is operated prior to the other of the mobile terminal or the in-vehicle apparatus, may be operable. In a case where communication between the in-vehicle apparatus and the mobile terminal is established and a vehicle is in driving, the in-vehicle apparatus may be inoperable and the mobile terminal may be operable.

According to the above configuration, in a case where the in-vehicle apparatus and the mobile terminal are connected and the in-vehicle apparatus displays the screen image of the mobile terminal, it is possible to prevent the false operation due to simultaneous operations by two persons. It is possible to prevent from disturbing concentration on the driving operation, and to preserve convenience to occupants.

It is understood that the present disclosure has been described in accordance with examples, but the present disclosure is not limited to the structure and the embodiment. The present disclosure also encompasses modifications and equivalents within various modifications. In addition, embodiments and various combinations, and further, only one element to them, less or even more, and the form and combinations including other is intended to fall within the spirit and scope of the present disclosure.

The invention claimed is:

1. An information presentation system comprising:
a mobile terminal to display a screen image, provided by an image data which is produced, on a mobile display portion; and
an in-vehicle apparatus, which is fixed to a vehicle or mounted on the vehicle to be portable,
wherein the mobile terminal includes
a mobile communicator for communicating with the in-vehicle apparatus, and
a mobile operation input portion, to which an operation input is performed by a user,
wherein the in-vehicle apparatus includes
a vehicle communicator for communicating with the mobile terminal, and
a vehicle operation input portion, to which the operation input is performed by the user,
wherein a communication between the in-vehicle apparatus and the mobile terminal is established, and the image data is sent from the mobile terminal to the in-vehicle apparatus so that a vehicle display portion of the in-vehicle apparatus displays the screen image, provided by the image data, and
wherein, in a case where the communication between the in-vehicle apparatus and the mobile terminal has been established, only one of the mobile terminal or the in-vehicle apparatus, in which the operation input has been performed prior to other of the mobile terminal or the in-vehicle apparatus, is operable when the one of the mobile terminal or the in-vehicle apparatus, in which the operation input has been performed prior to the other of the mobile terminal or the in-vehicle apparatus, is in operation.

2. The information presentation system according to claim 1,
wherein, in a case where the communication between the in-vehicle apparatus and the mobile terminal has been established, the in-vehicle apparatus is inoperable and the mobile terminal is operable when the vehicle is in driving.

3. The information presentation system according to claim 1,
wherein, in a case where the communication between the in-vehicle apparatus and the mobile terminal is established, the in-vehicle apparatus possesses a first permission information and a second permission information as a permission information, indicating authorization to receive an operation from the user,
wherein the mobile terminal:
obtains the first permission information, which is stored in the in-vehicle apparatus, through the mobile communicator when the operation input is performed by the user to the mobile operation input portion; and returns the first permission information to the in-vehicle apparatus through the mobile communicator after a process according to the operation input is completed, wherein the in-vehicle apparatus:

transmits the second permission information, which is stored in the in-vehicle apparatus, to the mobile terminal through the vehicle communicator when the vehicle is in driving; and receives a return of the second permission information from the mobile terminal through the vehicle communicator when the vehicle is not in driving, and wherein, in a case where the communication between the in-vehicle apparatus and the mobile terminal has been established, the in-vehicle apparatus is operable when the in-vehicle apparatus has both of the first permission information and the second permission information, and the mobile terminal is operable when the mobile terminal has at least one of the first permission information and the second permission information.

4. The information presentation system according to claim 1, wherein, in a case where the communication between the in-vehicle apparatus and the mobile terminal is established, the in-vehicle apparatus possesses a permission information, which indicates authorization to receive an operation from the user, wherein the mobile terminal:

obtains the permission information, which is stored in the in-vehicle apparatus, through the mobile communicator when the operation input is performed by the user to the mobile operation input portion; and returns the permission information to the in-vehicle apparatus through the mobile communicator after a process according to the operation input is completed, wherein the in-vehicle apparatus:

generates and possesses a prohibition information, which indicates prohibition to receive the operation from the user when the vehicle is in driving; and deletes the prohibition information when the vehicle is not in driving, and wherein, in a case where the communication between the in-vehicle apparatus and the mobile terminal has been established, the in-vehicle apparatus is operable when the in-vehicle apparatus has the permission information and does not have the prohibition information, and the mobile terminal is operable when the mobile terminal has the permission information.

5. The information presentation system according to claim 1, wherein the in-vehicle apparatus estimates whether the operation input is performed by the user to the mobile terminal, based on the image data which is received from the mobile terminal and on an operation by the user to the vehicle operation input portion, and invalidates the operation input from the vehicle operation input portion, based on a result of an estimation, when the mobile terminal is in operation.

6. The information presentation system according to claim 1, wherein the mobile terminal obtains a vehicle operation information, which is inputted to the vehicle operation input portion, from the in-vehicle apparatus, and switches between a first state and a second state:

in the first state, an operation inputted to the mobile operation input portion is validated and the vehicle operation information is invalidated; and in the second state, which is provided exclusively to the first state, based on the vehicle operation information, the vehicle operation information is validated and an operation which is inputted to the mobile operation input portion is invalidated when the in-vehicle apparatus is in operation.

7. The information presentation system according to claim 1, wherein the mobile display portion is a mobile touch panel, which is a touch panel integrated with at least a part of the mobile operation input portion.

8. The information presentation system according to claim 7, wherein the vehicle display portion is a vehicle touch panel, which is a touch panel integrated with at least a part of the vehicle operation input portion, wherein the in-vehicle apparatus:

displays the screen image, provided by the image data, on the vehicle touch panel, the image data being received from the mobile terminal through the vehicle communicator;

when an operation is performed by the user to the vehicle touch panel, specifies a region on a screen of the mobile touch panel as an operation object region, corresponding to a region on a screen of the vehicle touch panel to which the operation is performed; and sends a signal indicating the operation object region to the mobile terminal through the vehicle communicator, and wherein the mobile terminal performs an input operation in a same manner, where the operation object region is operated on the screen of the mobile touch panel when the mobile terminal receives the signal indicating the operation object region from the in-vehicle apparatus through the mobile communicator.

9. An in-vehicle apparatus, which is fixed to a vehicle or is mounted on the vehicle to be portable, the in-vehicle apparatus comprising:

a mobile operation input portion to perform an operation input by a user, wherein the in-vehicle apparatus:

receives an image data from a mobile terminal through a vehicle communicator, the image data being produced in the mobile terminal so as to be displayed on a screen of the mobile terminal; and displays a screen image provided by the image data, which is received from the mobile terminal, on a vehicle display portion, wherein, in a case where a communication between the in-vehicle apparatus and the mobile terminal has been established, only one of the mobile terminal or the in-vehicle apparatus, which is operated prior to other of the mobile terminal or the in-vehicle apparatus, is operable when the vehicle is not in driving and when the one of the mobile terminal or the in-vehicle apparatus, in which the operation input has been performed prior to the other of the mobile terminal or the in-vehicle apparatus, is in operation, and wherein, in a case where the communication between the in-vehicle apparatus and the mobile terminal has been established, the in-vehicle apparatus is inoperable and the mobile terminal is operable when the vehicle is in driving.

* * * * *